(12) United States Patent
Khadloya et al.

(10) Patent No.: US 12,382,001 B2
(45) Date of Patent: *Aug. 5, 2025

(54) EVENT ATTENDANCE MONITORING USING A VIRTUAL ASSISTANT

(71) Applicant: Nice North America LLC, Carlsbad, CA (US)

(72) Inventors: Krishna Khadloya, San Jose, CA (US); Vaidhi Nathan, San Jose, CA (US); Chandan Gope, Cupertino, CA (US)

(73) Assignee: Nice North America LLC, Carlsbad, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 18/156,746

(22) Filed: Jan. 19, 2023

(65) Prior Publication Data

US 2023/0156162 A1    May 18, 2023

Related U.S. Application Data

(63) Continuation of application No. 17/061,193, filed on Oct. 1, 2020, now abandoned, which is a continuation
(Continued)

(51) Int. Cl.
*H04N 7/18* (2006.01)
*G06N 20/00* (2019.01)
(Continued)

(52) U.S. Cl.
CPC ............. *H04N 7/183* (2013.01); *G06N 20/00* (2019.01); *G06V 10/764* (2022.01); *G06V 20/10* (2022.01);
(Continued)

(58) Field of Classification Search
CPC ...... H04N 7/183; G06N 20/00; G06V 40/103; G10L 17/00; G10L 25/51
See application file for complete search history.

(56) References Cited

U.S. PATENT DOCUMENTS 6,028,626 A   2/2000  Aviv
6,594,629 B1  7/2003  Basu et al.
(Continued)

FOREIGN PATENT DOCUMENTS

CN   104346607   11/2014
CN   106372576    2/2017
(Continued)

OTHER PUBLICATIONS

U.S. Appl. No. 16/280,806 U.S. Pat. No. 10,978,050, filed Feb. 20, 2019, Audio Type Detection.
(Continued)

*Primary Examiner* — Jeremiah C Hallenbeck-Huber
(74) *Attorney, Agent, or Firm* — Fox Rothschild LLP

(57) ABSTRACT

A function of a user-controlled virtual assistant (UCVA) device, such as a smart speaker, can be augmented using video or image information about an environment. In an example, a system for augmenting an UCVA device includes an image sensor configured to monitor an environment, a processor circuit configured to receive image information from the image sensor and use artificial intelligence to discern a presence of one or more known individuals in the environment from one or more other features in the environment. The system can include an interface coupled to the processor circuit and configured to provide identification information to the UCVA device about the one or more known human beings in the environment. The UCVA device can be configured by the identification information to update an operating mode of the UCVA device.

20 Claims, 15 Drawing Sheets

Related U.S. Application Data of application No. 16/271,183, filed on Feb. 8, 2019, now Pat. No. 10,834,365.

(60) Provisional application No. 62/632,421, filed on Feb. 20, 2018, provisional application No. 62/632,409, filed on Feb. 19, 2018, provisional application No. 62/632,410, filed on Feb. 19, 2018, provisional application No. 62/629,029, filed on Feb. 11, 2018, provisional application No. 62/628,148, filed on Feb. 8, 2018.

(51) Int. Cl.
*G06V 10/764* (2022.01)
*G06V 20/10* (2022.01)
*G06V 20/52* (2022.01)
*G06V 20/70* (2022.01)
*G06V 40/10* (2022.01)
*G06V 40/16* (2022.01)
*G10L 17/00* (2013.01)
*G10L 25/51* (2013.01)

(52) U.S. Cl.
CPC ............ *G06V 20/52* (2022.01); *G06V 20/70* (2022.01); *G06V 40/10* (2022.01); *G06V 40/103* (2022.01); *G06V 40/174* (2022.01); *G10L 17/00* (2013.01); *G10L 25/51* (2013.01)

(56) References Cited

U.S. PATENT DOCUMENTS

| | | | |
|---|---|---|---|
| 6,681,032 B2 | 1/2004 | Bortolussi et al. | |
| 7,113,090 B1 | 9/2006 | Saylor et al. | |
| 7,847,820 B2 | 12/2010 | Vallone et al. | |
| 7,999,857 B2 | 8/2011 | Bunn et al. | |
| 8,139,098 B2 | 3/2012 | Carter | |
| 8,237,571 B2 | 8/2012 | Wang et al. | |
| 8,527,278 B2 | 9/2013 | David | |
| 8,660,249 B2 | 2/2014 | Rondeau et al. | |
| 9,105,053 B2 | 8/2015 | Cao et al. | |
| 9,135,797 B2 | 9/2015 | Couper et al. | |
| 9,208,675 B2 | 12/2015 | Xu et al. | |
| 9,224,044 B1 | 12/2015 | Laska et al. | |
| 9,230,560 B2 | 1/2016 | Ehsani et al. | |
| 9,304,736 B1 | 4/2016 | Whiteley et al. | |
| 9,313,312 B2 | 4/2016 | Merrow et al. | |
| 9,479,354 B2 | 10/2016 | Yamanishi et al. | |
| 9,740,940 B2 | 8/2017 | Chattopadhyay et al. | |
| 9,830,932 B1 | 11/2017 | Gunderson et al. | |
| 9,942,518 B1* | 4/2018 | Tangeland | G06V 10/763 |
| 10,014,003 B2 | 7/2018 | Kim et al. | |
| 10,032,326 B1* | 7/2018 | Landers, Jr. | G06V 20/52 |
| 10,073,428 B2 | 9/2018 | Bruhn et al. | |
| 10,469,283 B1 | 11/2019 | Kinney et al. | |
| 10,569,420 B1* | 2/2020 | Cohen | B25J 13/084 |
| 10,834,365 B2 | 11/2020 | Khadloya et al. | |
| 10,978,050 B2 | 4/2021 | Khadloya et al. | |
| 2001/0047264 A1 | 11/2001 | Roundtree | |
| 2005/0267605 A1 | 12/2005 | Lee et al. | |
| 2006/0190419 A1 | 8/2006 | Bunn et al. | |
| 2012/0026328 A1 | 2/2012 | Sethna et al. | |
| 2012/0136689 A1* | 5/2012 | Ickman | G06Q 50/01 705/7.19 |
| 2012/0143363 A1 | 6/2012 | Liu et al. | |
| 2012/0293606 A1* | 11/2012 | Watson | H04N 23/60 348/E7.085 |
| 2013/0237240 A1* | 9/2013 | Krantz | H04W 4/021 455/456.1 |
| 2013/0275138 A1 | 10/2013 | Gruber et al. | |
| 2014/0046878 A1 | 2/2014 | Lecomte et al. | |
| 2014/0222436 A1 | 8/2014 | Binder et al. | |
| 2015/0009278 A1* | 1/2015 | Modai | G06V 40/23 348/14.08 |
| 2015/0149231 A1* | 5/2015 | Nicolas | H04W 4/80 705/7.19 |
| 2015/0221321 A1 | 8/2015 | Christian | |
| 2016/0364963 A1 | 12/2016 | Matsuoka et al. | |
| 2016/0378861 A1 | 12/2016 | Eledath et al. | |
| 2016/0379456 A1 | 12/2016 | Nongpiur et al. | |
| 2017/0311053 A1* | 10/2017 | Ganjam | G06V 20/20 |
| 2017/0329466 A1 | 11/2017 | Krenkler et al. | |
| 2018/0047230 A1* | 2/2018 | Nye | G07C 9/37 |
| 2018/0232902 A1* | 8/2018 | Albadawi | G08B 13/1427 |
| 2018/0261213 A1 | 9/2018 | Arik et al. | |
| 2018/0342329 A1 | 11/2018 | Rufo et al. | |
| 2019/0028759 A1* | 1/2019 | Yuan | H04L 12/282 |
| 2019/0043525 A1 | 2/2019 | Huang et al. | |
| 2019/0139565 A1 | 5/2019 | Chang et al. | |
| 2019/0236554 A1* | 8/2019 | Hill | G06Q 10/06 |
| 2019/0246075 A1 | 8/2019 | Khadloya et al. | |
| 2019/0259378 A1 | 8/2019 | Khadloya et al. | |
| 2019/0362608 A1 | 11/2019 | Horling | |
| 2019/0377325 A1 | 12/2019 | Angola Abreu | |
| 2021/0029330 A1 | 1/2021 | Khadloya et al. | |
| 2021/0210074 A1 | 7/2021 | Khadloya et al. | |

FOREIGN PATENT DOCUMENTS

| | | |
|---|---|---|
| CN | 107609512 | 1/2018 |
| CN | 108540762 | 9/2018 |

OTHER PUBLICATIONS

U.S. Appl. No. 17/203,269, filed Mar. 16, 2021, Audio Type Detection.
U.S. Appl. No. 16/271,183 U.S. Pat. No. 10,834,365, filed Feb. 8, 2019, Audio-Visual Monitoring Using a Virtual Assistant.
U.S. Appl. No. 17/061,193, filed Oct. 1, 2020, Audio-Visual Monitoring Using a Virtual Assistant.
"U.S. Appl. No. 17/203,269, Final Office Action mailed May 2, 2023", 16 pgs.
"U.S. Appl. No. 17/203,269, Pre-Appeal Brief Conference Request filed Aug. 2, 2023", 5 pgs.
"U.S. Appl. No. 17/203,269, Decision on Pre-Appeal Brief Request mailed Aug. 17, 2023", 2 pgs.
"U.S. Appl. No. 17/203,269, Non Final Office Action mailed Dec. 6, 2023", 20 pgs.
"U.S. Appl. No. 17/203,269, Response filed Feb. 22, 2024 to Non Final Office Action mailed Dec. 6, 2023", 14 pgs.
Deller, John R, "Discrete-Time Processing of Speech Signals", New York: Institute of Electrical and Electronics Engineers, (2015).
"Home Invasion: Google, Amazon Patent Filings Reveal Digital Home Assistant Privacy Problems", Comsumer Watchdog Executive Summary, accessed Feb. 4, 2019, URL: https: www.consumerwatchdog.org sites default files Dec. 2017 Digital%20Assistants%20and%20Privacy.pdf, (Dec. 2017), 15 pgs.
"Eyewatch", Eyewatch Website, URL: https: eye-watch.in Login.action, (accessed Feb. 4, 2019), 11 pgs.
"Home Automation with Smart Speakers—Amazon Echo vs. Google Home vs. Apple HomePod", Citius Minds Blog, accessed Feb. 4, 2019, URL: https: www.citiusminds.com blog wp-content uploads 2017 08 Home_Automation_Smart_Speakers.pdf, (Aug. 2017), 20 pgs.
"U.S. Appl. No. 16/271,183, Non Final Office Action mailed Dec. 11, 2019", 18 pgs.
"U.S. Appl. No. 16/271,183, Response filed Mar. 10, 2020 to Non Final Office Action mailed Dec. 11, 2019", 15 pgs.
"U.S. Appl. No. 16/280,806, Non Final Office Action mailed May 13, 2020", 17 pgs.
"U.S. Appl. No. 16/271,183, Notice of Allowance mailed Jun. 25, 2020", 6 pgs.
"U.S. Appl. No. 16/280,806, Response filed Sep. 14, 2020 to Non Final Office Action mailed May 13, 2020", 18 pgs.
"U.S. Appl. No. 16/280,806, Notice of Allowance mailed Dec. 10, 2020", 9 pgs.
"U.S. Appl. No. 17/061,193, Non Final Office Action mailed Dec. 10, 2020", 14 pgs.

(56) References Cited

OTHER PUBLICATIONS

"U.S. Appl. No. 17/061,193, Response filed Mar. 10, 2021 to Non Final Office Action mailed Dec. 10, 2020", 14 pgs.
"U.S. Appl. No. 17/061,193, Final Office Action mailed Jul. 2, 2021", 17 pgs.
"U.S. Appl. No. 17/061,193, Response filed Aug. 27, 2021 to Final Office Action mailed Jul. 2, 2021", 13 pgs.
"U.S. Appl. No. 17/061,193, Advisory Action mailed Sep. 22, 2021", 2 pgs.
"U.S. Appl. No. 17/061,193, Non Final Office Action mailed Mar. 16, 2022", 13 pgs.
"U.S. Appl. No. 17/061,193, Response filed Jul. 18, 2022 to Non Final Office Action mailed Mar. 16, 2022", 14 pgs.
"U.S. Appl. No. 17/061,193, Final Office Action mailed Sep. 23, 2022", 14 pgs.
"U.S. Appl. No. 17/203,269, Non Final Office Action mailed Dec. 9, 2022", 16 pgs.
"U.S. Appl. No. 17/203,269, Response filed Apr. 10, 2023 to Non Final Office Action mailed Dec. 9, 2022", 11 pgs.
Clavel, Chloe, "Events detection for an audio-based surveillance system", 2005 IEEE International Conference on Multimedia and Expo. IEEE, (2005), 4 pgs.
Colangelo, Federico, "Enhancing audio surveillance with hierarchical recurrent neural networks", 14th IEEE International Conference on Advanced Video and Signal Based Surveillance (AVSS). IEEE, (2017).
Dennis, Jonathan, "Spectrogram image feature for sound event classification in mismatched conditions", IEEE signal processing letters 18.2, (2010), 130-133.
Huang, Hua, "WiDet: Wi-Fi Based Device-Free Passive Person Detection with Deep Convolutional Neural Networks", Proc. of the 21st ACM Intl. Conference on Modeling, Analysis and Simulation of Wireless and Mobile Systems (MSWIM), (2018), 53-60.
Jacobson, Julie, "Patent: Vivint Door Knock Tech Might Help Identify Guests by Unique Sound Signatures", CE Pro Magazine and Website, accessed Feb. 4, 2019, URL: https: www.cepro.com article patent_audio_analytics_ai_vivint_door_knock_identify_people_sound_signature, (Apr. 20, 2017), 7 pgs.
Jurrien, Ilse, "Samsung Bixby Smart Speaker met Camera en Display", LetsGo Digital, accessed Feb. 4, 2019, w English machine translation, URL: https: nl.letsgodigital.org speakers-hifi samsung-bixby-smart-speaker , (Jun. 13, 2018), 12 pgs.
Metz, Rachel, "Using Deep Learning to Make Video Surveillance Smarter", MIT Technology Review Online, [Online] Retrieved from the internet on Feb. 4, 2019: URL: https: www.technologyreview.com s 540396 using-deep-learning-to-make-video-surveillance-smarter , (Aug. 17, 2015), 3 pgs.
Ntalampiras, Stavros, "An adaptive framework for acoustic monitoring of potential hazards", EURASIP Journal on Audio, Speech, and Music Processing 2009.1(2009): 594103, (2009), 15 pgs.
Rasti, Pejman, "Convolutional Neural Network Super Resolution for Face Recognition in Surveillance Monitoring", Proc. of the Intl. Conference on Articulated Motion and Deformable Objects (AMDO), (Jul. 2, 2016), 175-184.
Shaw, C. Mitchell, "New Patents: Google Wants to Monitor Everything You and Your Children Do at Home", The New American, accessed Feb. 4, 2019, URL: https: www.thenewamerican.com tech computers item 30733-new-patents-google-wants-to-monitor-everything-you-and-your-children-do-at-home, (Nov. 26, 2018), 9 pgs.
Whitney, Lance, "How to Call Someone From Your Amazon Echo", PC Magazine Online, accessed Feb. 4, 2019, URL: https: www.pcmag.com feature 358674 how-to-call-someone-from-your-amazon-echo, (Dec. 25, 2018), 13 pgs.

\* cited by examiner

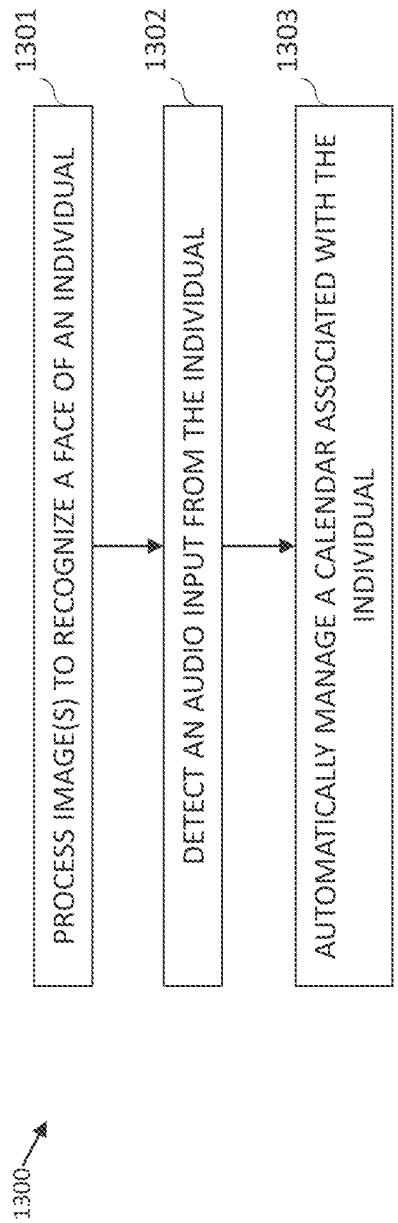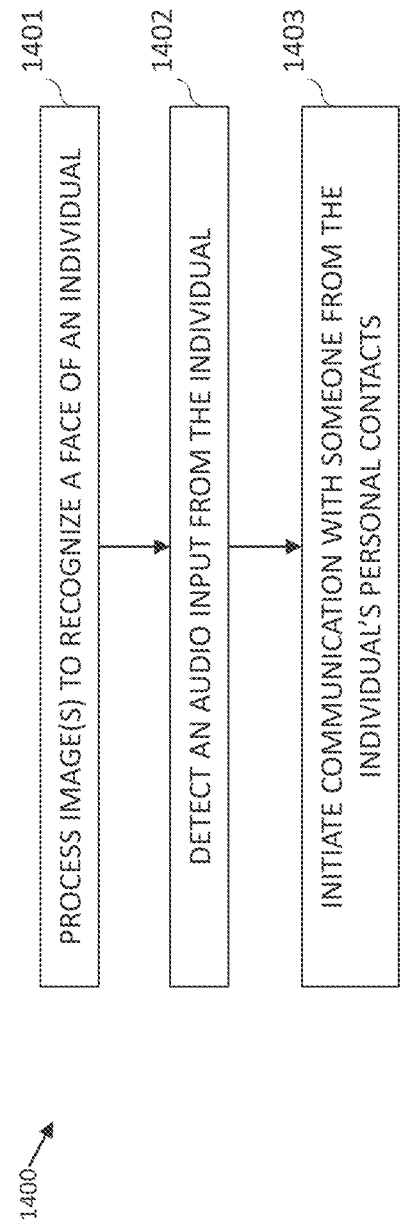

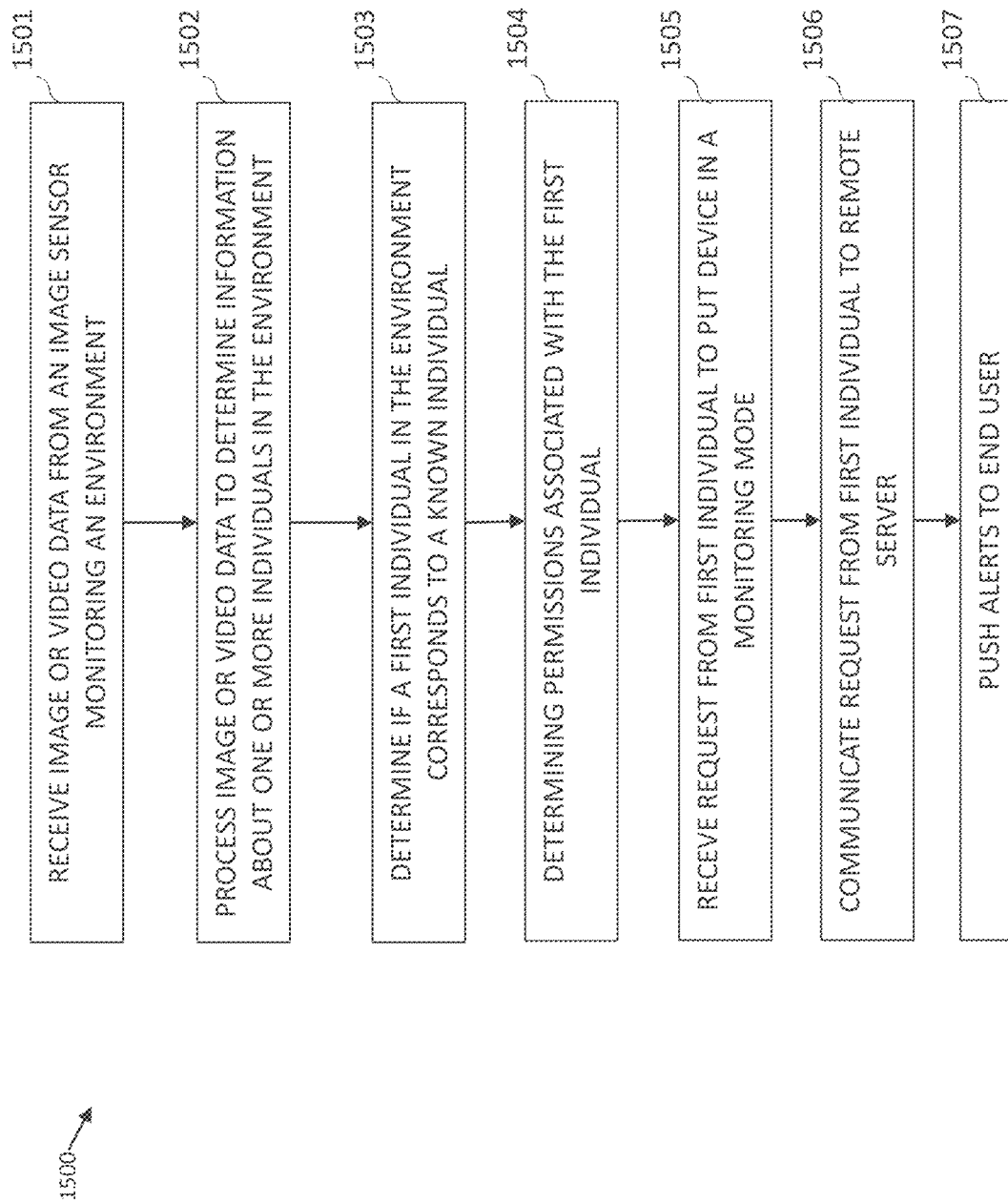

EVENT ATTENDANCE MONITORING USING A VIRTUAL ASSISTANT

CLAIM OF PRIORITY

This patent application is a continuation which claims the benefit of priority of U.S. patent application Ser. No. 17/061,193, entitled "Audio Visual Monitoring Using a Virtual Assistant", filed on Oct. 1, 2020, and this patent application is a continuation which claims the benefit of priority of U.S. patent application Ser. No. 16/271,183, entitled "Audio Visual Monitoring Using a Virtual Assistant", filed on Feb. 8, 2019, and this patent application claims the benefit of priority of U.S. Provisional Patent Application Ser. No. 62/628,148, entitled "System and Method for Intelligent Video for Home Audio Assistants Part 1: Recognition and Personalization Use Cases", filed on Feb. 8, 2018, and this patent application claims the benefit of priority of U.S. Provisional Patent Application Ser. No. 62/629,029, entitled "System and Method for Intelligent Video for Office Audio Assistants", filed on Feb. 11, 2018, and this patent application claims the benefit of priority of U.S. Provisional Patent Application Ser. No. 62/632,409, entitled "System and Method for adding Intelligent Audio Monitoring to Home Audio Assistants (Smart Speakers)", filed on Feb. 19, 2018, and this patent application claims the benefit of priority of U.S. Provisional Patent Application Ser. No. 62/632,410, entitled "System and Method for adding Intelligent Video Monitoring to Home Audio Assistants", filed on Feb. 19, 2018, and this patent application claims the benefit of priority of U.S. Provisional Patent Application Ser. No. 62/632,421, entitled "System and Method for Audio Type Detection", filed on Feb. 20, 2018, the benefit of priority of each of which is claimed hereby, and each of which is incorporated by reference herein in its entirety.

BACKGROUND

An intelligent assistant device can include a software-implemented agent that can perform tasks or services for a user. The performed tasks can be based on a user input, device location awareness, and information from a variety of online sources, among other things. Intelligent assistant devices, sometimes referred to as "smart speakers", can be used in home or office environments. The devices include one or more microphones for receiving a voice-based or other audible input signal, and include one or more speakers for relaying information to a user. They can also include touch panels such as security system touch panels or control panels with microphones, speakers, and/or touch interfaces or can include a headless device. Use cases for such devices generally include responding to audio-based command, touch, or gestures, and/or display of video or other information. These devices and user input mechanisms are used to control other smart devices such as security sensors, lights, appliances, televisions and others.

In some examples, an assistant device can retrieve various information in response to a user inquiry, such as information about weather conditions, traffic, news, stock prices, user schedules, and retail prices, among other things. Some intelligent assistant devices perform concierge-type tasks such as making dinner reservations, purchasing event tickets, and making travel arrangements, and some can be configured to automatically perform various data management tasks based on online information and events, including without user initiation or interaction.

Video monitoring and surveillance for security, asset protection, process control, and other purposes, is widely performed using closed circuit television and other systems. The cost of such systems has reduced significantly in recent years as camera and monitoring components have become more widely available. As a result, these systems have proliferated in commercial and residential applications. In some systems, video information is sent from a camera to a central processor for video analysis, and the central processor can be located some distance away from the camera. In some examples, the video information is sent from the camera to a remote server via the internet or other network. Such data communication can introduce delays in data processing and decision making.

SUMMARY

The present inventors have recognized, among other things, that a problem to be solved can include receiving context or authentication information to augment or enhance one or more functions of an audio assistant device or "smart speaker" device. For example, in a home or office environment, conventional audio assistants or smart speakers use microphones and speakers to interact with users and the environment. Such devices can process audio inputs received from the environment and in response perform various user-requested actions. However, without visual information about the environment, such devices are limited in terms of their ability to process and understand context clues or to have situational awareness. The present subject matter can help provide a solution to this problem, such as by using video or image information as an input to a decision engine or processor circuit that interfaces or is integrated with an audio assistant device. The solution can include processing video or image information to determine one or more features of an environment, such as including information about a presence or absence of one or more known or unknown individuals, pets, and/or other objects of interest in the environment, and then changing a function of the audio assistant device. In an example, changing a device function can include changing a device response such that the response is personalized to an individual who is detected in the environment.

The present inventors have further recognized, among other things, that a problem to be solved can include augmenting one or more functions of an audio assistant device for safety, security, monitoring, or surveillance, and reducing false positive detections of adverse events or other events that can be deemed or understood to be of no significant interest. The present subject matter can help provide a solution to this problem, such as by using image information from the monitored environment to detect one or more changes, individuals, or events in the environment. In an example, the solution can include using machine learning to process the image information, or to process audio information received by the audio assistant, to help detect the one or more changes, individuals, or events in the environment.

Aspect 1 can include or use subject matter (such as an apparatus, a system, a device, a method, a means for performing acts, or a device readable medium including instructions that, when performed by the device, can cause the device to perform acts, or an article of manufacture), such as can include or use a system for augmenting one or more functions of a user-controlled virtual assistant (UCVA) device. In an example, the system comprises an image sensor configured to monitor an environment, a processor circuit configured to receive image information from the image sensor and discern a presence of one or more known human beings in the environment from one or more other features in the environment, and an interface coupled to the processor circuit and configured to provide identification information to the UCVA device about the one or more known human beings in the environment, wherein the UCVA device is configured by the identification information to update an operating mode of the UCVA device.

Aspect 2 can include or use, or can optionally be combined with the subject matter of Aspect 1, to optionally include the interface as a hardware layer interface that couples the processor circuit to a different processor circuit in the UCVA device.

Aspect 3 can include or use, or can optionally be combined with the subject matter of Aspect 1 to optionally include the interface as a software layer interface that communicates information from the processor circuit to a different processor circuit in the UCVA device.

Aspect 4 can include or use, or can optionally be combined with the subject matter of one or any combination of Aspects 1 through 3 to optionally include the UCVA device being configured by the identification information to personalize an interaction between the UCVA device and the one or more known human beings in the environment.

Aspect 5 can include or use, or can optionally be combined with the subject matter of one or any combination of Aspects 1 through 4 to optionally include the interface further configured to receive information from the UCVA device, and the information from the UCVA device includes user authentication information or configuration information for use by the image sensor.

Aspect 6 can include or use, or can optionally be combined with the subject matter of one or any combination of Aspects 1 through 5 to optionally include the UCVA device and the image sensor are disposed in and configured to monitor the same environment.

Aspect 7 can include or use, or can optionally be combined with the subject matter of one or any combination of Aspects 1 through 6 to optionally include or use the processor circuit configured to apply machine learning to the image information from the image sensor to discern the presence of the one or more known human beings.

Aspect 8 can include or use, or can optionally be combined with the subject matter of Aspect 7, to optionally include or use the processor circuit configured to use a neural network, configured with a human classification model, to process the image information from the image sensor and discern the presence of the one or more known human beings.

Aspect 9 can include or use, or can optionally be combined with the subject matter of one or any combination of Aspects 1 through 8 to optionally include or use the UCVA device configured by the identification information to operate in an environment monitoring mode.

Aspect 10 can include or use, or can optionally be combined with the subject matter of Aspect 9, to optionally include, when the UCVA is configured to operate in the environment monitoring mode, the UCVA is configured to use a microphone to receive audio information about the environment and to use a different second processor circuit to classify the received audio information about the environment.

Aspect 11 can include or use, or can optionally be combined with the subject matter of Aspect 10, to optionally include or use the different second processor circuit to apply machine learning to classify the received audio information about the environment as including one or more of a dog bark, a glass break or other material break, a gun shot, human speech, or an environment alarm.

Aspect 12 can include or use, or can optionally be combined with the subject matter of one or any combination of Aspects 9 through 11, to optionally include, when the UCVA is configured to operate in the environment monitoring mode, the UCVA and/or the image sensor are configured to monitor the environment to identify whether the environment includes a moving object. In an example, the moving object can be identified using information about position changes determined from a series of images, or can be identified using information from an audio sensor, such as using information about signal frequency changes or spectral content changes.

Aspect 13 can include or use, or can optionally be combined with the subject matter of Aspect 12, to optionally include the UCVA and/or the image sensor configured to monitor a specified portion of the environment for the moving object, the specified portion of the environment comprising less than all of the environment.

Aspect 14 can include or use, or can optionally be combined with the subject matter of one or any combination of Aspects 1 through 13 to optionally include or use the UCVA device configured by the identification information to operate in an assistant mode. In an example, the UCVA device can initiate its assistant mode automatically, such as in response to detection of a known individual.

Aspect 15 can include or use, or can optionally be combined with the subject matter of Aspect 14, to optionally include, when the UCVA is configured to operate in the assistant mode, the UCVA is configured to personalize a greeting for the one or more known human beings in the environment.

Aspect 16 can include or use, or can optionally be combined with the subject matter of Aspect 14 or Aspect 15, to optionally include, when the UCVA is configured to operate in the assistant mode, the UCVA is configured to personalize a calendaring event for the one or more known human beings in the environment.

Aspect 17 can include or use, or can optionally be combined with the subject matter of one or any combination of Aspects 14 through 16 to optionally include, when the UCVA is configured to operate in the assistant mode, the UCVA is configured to offer a personalized response to a user inquiry when the user is one of the known human beings, wherein the personalized response is based on a contact database that is associated with the user.

Aspect 18 can include or use, or can optionally be combined with the subject matter of one or any combination of Aspects 14 through 17 to optionally include, when the UCVA is configured to operate in the assistant mode, the UCVA is configured to offer a personalized response to a user inquiry when the user is one of the known human beings, wherein the personalized response is based on an enterprise application feature accessible by the user but not accessible by other unauthorized users.

Aspect 19 can include or use, or can optionally be combined with the subject matter of one or any combination of Aspects 1 through 18 to optionally include or use the image sensor comprising two 180-degree view image sensors, and the sensors are provided in a back-to-back configuration to provide a 360-degree field of view.

Aspect 20 can include, or can optionally be combined with the subject matter of one or any combination of Aspects 1 through 19 to include or use, subject matter (such as an apparatus, a method, a means for performing acts, or a machine readable medium including instructions that, when performed by the machine, that can cause the machine to perform acts), such as can include or use an audio-video personal assistant device comprising an image sensor configured to provide image information about an environment and an audio sensor configured to provide audio information about the environment. In an example, Aspect 20 includes a processor circuit configured to receive the image information from the image sensor and to receive the audio information from the audio sensor and a non-transitory memory circuit coupled to the processor circuit, and the non-transitory memory circuit comprises instructions that, when performed by the processor circuit, configure the processor circuit to analyze one of the image information or the audio information to identify whether a known individual is present in the environment, use the other one of the image information and the audio information to confirm that the known individual is present in the environment, and perform a personalized task associated with the known individual when the known individual is confirmed to be present in the environment.

Aspect 21 can include or use, or can optionally be combined with the subject matter of Aspect 20, to optionally include instructions that further configure the processor circuit to analyze one of the image information or the audio information to identify multiple individuals present at an event in the environment and provide information about an attendance at the event based on the identified individuals.

Aspect 22 can include or use, or can optionally be combined with the subject matter of Aspect 20 or 21, to optionally include instructions that further configure the processor circuit to look up an expected attendance for the event, determine one or more individuals not present at the event by comparing the expected attendance with the identified multiple individuals present, and automatically send a reminder about the event to the one or more individuals determined to be not present at the event.

Aspect 23 can include or use, or can optionally be combined with the subject matter of one or any combination of Aspects 20 through 22 to optionally include instructions that further configure the processor circuit to analyze one of the image information or the audio information to identify multiple individuals present at an event in the environment, analyze one of the image information or the audio information to identify a particular individual, from among the multiple individuals, who is speaking at the event, and record the image information and/or the audio information when the particular individual is speaking. In an example, Aspect 23 can include recording metadata such as a tag that includes information about the particular individual's identity, such as the individual's name.

Aspect 24 can include or use, or can optionally be combined with the subject matter of one or any combination of Aspects 20 through 23 to optionally include instructions to perform a personalized task associated with the known individual, including instructions to personalize a greeting for the known individual, or instructions to personalize a calendaring event for the known individual, or instructions to offer a personalized response to an inquiry submitted by the known individual, or instructions to enable or make available to the known individual an enterprise application feature.

Aspect 25 can include, or can optionally be combined with the subject matter of one or any combination of Aspects 1 through 24 to include or use, subject matter (such as an apparatus, a method, a means for performing acts, or a machine readable medium including instructions that, when performed by the machine, that can cause the machine to perform acts), such as can include or use a method for incorporating intelligent video monitoring to an audio assistant wherein the audio assistant is provided in an environment. In an example, Aspect 25 includes receiving image information from a camera configured to monitor the environment, and using a processor circuit, analyzing the image information to identify one or more individuals present in the environment, comparing the identified one or more individuals with a database of enrolled individuals to determine whether the identified one or more individuals is one of the enrolled individuals, and when the comparison indicates the identified one or more individuals is one of the enrolled individuals, then receiving a command from the identified one or more individuals to place the audio assistant in a security monitoring mode. Aspect 25 can further include, using the processor circuit, analyzing other later-received image information from the camera to determine whether an unauthorized object or individual is present when the audio assistant is in the security monitoring mode, and communicating an alert to at least one of the enrolled individuals when an unauthorized object or individual is determined to be present.

Aspect 26 can include or use, or can optionally be combined with the subject matter of Aspect 25, to optionally include communicating the command to place the audio assistant in the security monitoring mode to a remote server, and wherein the communicating the alert includes using the remote server.

Aspect 27 can include or use, or can optionally be combined with the subject matter of Aspect 25 or 26, to optionally include the communicating the alert includes communicating, to the at least one of the enrolled individuals, video and/or audio information about the unauthorized object or individual.

Aspect 28 can include or use, or can optionally be combined with the subject matter of one or any combination of Aspects 25 through 27 to optionally include analyzing the image information to identify a look direction, mood, or facial feature of the one or more individuals present in the environment.

Aspect 29 can include or use, or can optionally be combined with the subject matter of one or any combination of Aspects 25 through 28 to optionally include analyzing the image information to identify the one or more individuals including using a neural network to process the image information.

Aspect 30 can include or use, or can optionally be combined with the subject matter of one or any combination of Aspects 25 through 29 to optionally include receiving the command from the identified one or more individuals including determining that an enrolled individual is absent from the environment.

Aspect 31 can include or use, or can optionally be combined with the subject matter of one or any combination of Aspects 25 through 30 to optionally include analyzing the later-received image information including determining a dwell time for an individual in the environment, and determining the individual is unauthorized after a specified dwell duration elapses.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 13 illustrates generally an example of a sixth method that can include automatically managing a calendar associated with a recognized individual.

FIG. 14 illustrates generally an example of a seventh method that can include automatically initiating communication between a recognized individual and another individual.

FIG. 15 illustrates generally an example of an eighth method that can include changing a mode of a user controlled assistant device.

DETAILED DESCRIPTION

Figure 1:
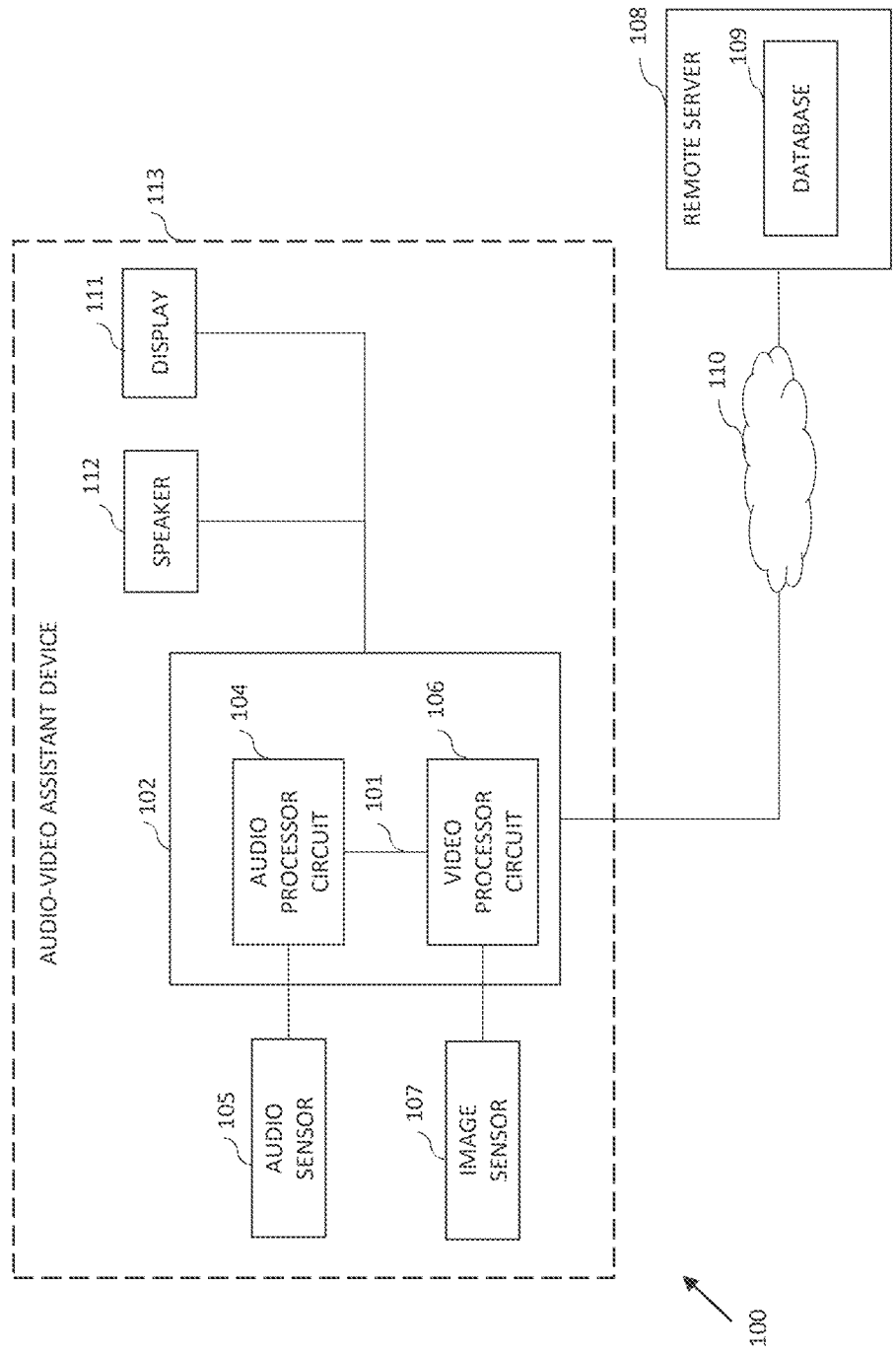
FIG. 1 illustrates generally an example of a system that includes an audio-video assistant device.

In an example, decision making by an audio assistant devices can be augmented or enhanced using information from a video or image sensor. Various systems and methods can be used to combine or join information from audio and image sensors such as to make audio assistants and other computing devices more effective and more secure. Such enhanced audio assistant devices can provide a more secure and personalized user experience and can enhance productivity and communication. In an example, an image sensor can be added to an existing or legacy audio-only, microphone-based office assistants or smart speaker to enable additional functions and use cases.

In an example, an audio-video assistant device can include one or more microphones, one or more cameras or image sensors, and one or more processor circuits. The device can receive and process audio and video or image input data about an environment such as to identify or extract information about objects and people to determine what or who is present in the environment. In an example, the input information can be further processed to identify specific individuals by name or type and one or more responsive actions can be initiated. The combined audio and visual information enables better understanding of who can be speaking or providing commands to the assistant device, and in some cases can be used to eliminate a requirement for a specific wakeword or hotword, that is, an action word or trigger word from the user that is recognized by a device as a signal to begin monitoring.

In an example, the audio-video assistant device provides an enhanced security and lifestyle monitoring system. For example, in a security mode, the device can use its audio receiver and processor to identify any abnormal sounds such as breaking glass, a gun shot, a dog bark, a security alarm, a fire alarm, a smoke alarm, a water alarm, loud voices or yelling, or any other unusual noise in home or building. In an example, the device can use its audio receiver and processor to identify human speech or a conversation when the environment is otherwise expected to be vacant. In an example, the device can use artificial intelligence to discern normal from abnormal noises, objects, or activities in a monitored environment and, when such an abnormal noise, object, or activity is identified, then the device can initiate an alert or alarm.

In an example, systems and methods disclosed herein include joined audio and image sensors to make audio assistant devices and similar devices smarter by becoming security devices while users are away from their homes and offices. As used herein, an image sensor is a camera or other sensor disposed in an environment that detects and conveys information that constitutes an image of all or a portion of the environment. In an example, the image sensor detects image information by converting the variable attenuation of light waves into signals, or small bursts of current, that convey the information. The waves can be light or other electromagnetic radiation. Image sensors are used in various analog and digital electronic imaging devices, including cameras, camera modules, medical imaging equipment, night vision equipment such as thermal imaging devices, and others. As used herein, an audio sensor includes an acoustic transducer configured to sense sound waves in an environment and convert them into electric signals that can be analyzed by a processor circuit. In an example, the processor circuit can perform its analysis in time and/or frequency domains.

In an example, a processor circuit can receive information from an image sensor and continuously process images from the sensor such as substantially in real-time. The processor circuit can analyze where motion occurs in an environment, such as using a motion detection algorithm. In an example, the processor circuit can detect and analyze human faces in the image, such as using a face detection algorithm. In an example, the processor circuit can use information about one or more detected faces to recognize or identify a person or persons in the environment or scene. In an example, the processor circuit can perform object-based motion detection, and can identify moving objects in the scene and classify them as one or more of a human, pet, plant, smart robot like a vacuum cleaner, or as some other household or office device that is known or expected to move around, such as in a predefined or specified area or zone.

In an example, an assistant device can be configured to automatically or manually enter an environment monitoring mode. For example, a user, such as an individual who is authenticated by the device, can use a command or trigger word such as "Start Monitoring Mode" or "Start Video Monitoring Mode" to place the device in an environment monitoring mode. The device will then begin an appropriate video and/or audio monitoring algorithm, or set of algorithms, provided the user was authorized to initiate such an activity. In an example, the environment monitoring mode can start automatically when the user enters or exits a scene or environment, or according to a predefined schedule. Various monitoring rules can be provided to define a type and method of alerting an end user or system owner. For example, a push notification can be provided to a user's mobile device, and rules governing such notification processing can be stored either in a remote, cloud-based computing environment or can be entered by a user during an initial setup or configuration phase.

In an example, an assistant device according to the present disclosure can use processor-implemented artificial intelligence to analyze or respond to information from the audio sensor, from the image sensor, or from a combination of audio, video, and/or other monitoring sensors such as thermostat or other environment condition sensors, door sensors, window sensors, lock sensors, etc. The processor-implemented artificial intelligence, as used herein, generally includes one or both of machine learning and deep learning. In some instances, one or the other of machine learning and deep learning can be used or implemented to achieve a particular result. Accordingly references herein to one or the other of machine learning and deep learning can be understood to encompass one or both forms of artificial intelligence processing.

Generally, machine learning encompasses use of algorithms to parse data, learn from the data, and then later apply what is learned to make informed decisions about new data. Machine learning algorithms can be guided by programmers and, in some cases, machine learning algorithms can become progressively "better" at decision making over time, especially as its reference data set grows.

Deep learning algorithms can be designed to continually analyze new and old data using logic structures for drawing conclusions. In some examples, deep learning uses or employs layers of algorithms, sometimes referred to as a neural network. Neural networks generally use trained models to accomplish various tasks. The models define, at least at a high level, features or processing nodes that are interconnected to move data toward a decision output. The models can be static or dynamic depending on the configuration of the deep learning implementation.

FIG. 1 illustrates generally an example of a system 100 that includes an audio-video assistant device 113. The system 100 includes a first processor circuit 102 that can include one or more processing cores, and each core can have a respective different function. In an example, the first processor circuit 102 is a notional circuit that includes multiple different discrete processor circuits or cores that are coupled by an interface 101. In the example of FIG. 1, the first processor circuit 102 includes an audio processor circuit 104 and a video processor circuit 106. The system 100 includes an audio sensor 105 such as a microphone that can receive audio signals and provide audio signal information to the audio processor circuit 104. The system 100 includes an image sensor 107 such as a camera that can receive image signals and provide image information to the video processor circuit 106.

In an example, the audio processor circuit 104 and/or the video processor circuit 106 can be separate hardware processor entities, while in other examples, the audio processor circuit 104 and/or the video processor circuit 106 can be software-implemented modules that are executed on the same or different processor circuit. In an example, the audio processor circuit 104 and the video processor circuit 106 can be integrated together in a single device such as the first processor circuit 102. In another embodiment of the present disclosure, the audio processor circuit 104 and the video processor circuit 106 can be independent units communicatively coupled to each other using the interface 101.

In an example, the audio sensor 105 includes one or more microphones, such as an array of microphones, configured to receive one or more audio input signals such as from a user or from various non-user-based occurrences in an environment. In an example, one or more signals from the audio sensor 105 can be processed for noise reduction, feedback elimination, beam forming and automatic gain control.

In an example, the image sensor 107 includes a sensor with a particular field of view (FOV). In an example, the image sensor 107 includes two 180 degree view sensors, such as can be vertically joined back-to-back to provide a 360 degree view of the environment. In another example, the image sensor 107 includes a camera providing a 180 degree view in a horizontal direction. Such a single camera can be configured to rotate or look in a circular manner around the environment, and an image generated by such camera can be warped and de-warped for analysis or display purposes.

The first processor circuit 102 can be communicatively coupled to a remote server 108 using a network 110. The network 110 can be any suitable wired network, wireless network, or a combination of wired, wireless, or other network. In an example, the network 110 includes a LAN or wireless LAN connection, an internet connection, a point-to-point connection, or other network connection and combinations thereof. The network 110 can be any other type of network that is configured to transmit or receive data from host computers, personal devices, telephones, or any other electronic devices. The network 110 can be a combination of an enterprise network (or the Internet) and a cellular network, in which case, suitable systems and methods are employed to seamlessly communicate between the networks, and a mobile switching gateway can be used to communicate with a computer network gateway to pass data between the networks. The network 110 can include or use any software, hardware, or computer applications that can provide a medium to exchange signals or data in various formats.

The system 100 further includes a display 111 for displaying information generated by the first processor circuit 102, and a speaker 112 for providing audible information generated by the first processor circuit 102, such as including audible responses to user inquiries. In an example, the display 111 and the speaker 112 can be part of a computing device, such as a personal computer, a laptop, a smart phone, and the like.

In an example, the audio sensor 105, the audio processor circuit 104, and optionally the speaker 112, can be integrated in a single device, sometimes referred to as an audio assistant, an intelligent audio assistant device, a voice-controlled virtual assistant (VCVA), or a user-controlled virtual assistant (UCVA). In an example, the image sensor 107, the video processor circuit 106, and optionally the display 111, can be integrated together in a single device, sometimes referred to as a video assistant or an intelligent video assistant device. In an example, the intelligent video assistant device can be communicatively coupled to an intelligent audio assistant device using an interface such as the interface 101 that couples the processor circuits. In the example illustrated in FIG. 1, the central processor circuit 102, the audio sensor 105, the image sensor 107, the display 111, and the speaker 112 can be integrated together to form a device referred to herein as an intelligent audio-video assistant device 113.

Artificial intelligence-based analysis of information from the image sensor 107 can be performed locally in the audio-video assistant device 113 by the video processor circuit 106 or can be performed elsewhere, such as using the remote server 108. In an example, the video processor circuit 106 and/or the remote server 108 can include or access a database 109 configured to store, among other things, object template data, facial image data, name and addresses information of registered users, etc. In an office environment, the database 109 can store information about one or more employees, including names, roles, permitted or expected in/out times, designations, accessible systems, contact lists, calendars, etc. In an example, valid and recognizable users of a system can be predefined or enrolled or identified by the audio-video assistant device 113 and saved in the database 109. The database 109 can also be in communication with office enterprise servers to access office data of one or more users.

In operation, the video processor circuit 106 receives video streams/images of one or more individuals from the image sensor 107 and converts each video stream into a plurality of static images or frames. The video streams/images can be processed either locally at the video processor circuit 106, or at the remote server 108, such as using machine learning and deep learning, to extract user information including face information like facial features, angle or look direction, mood, etc. In an example, the video processor circuit 106 can count or determine a number of people that are within a FOV of the image sensor 107 and use its artificial intelligence to determine who is present, who is talking, and respective look directions for the identified individuals.

In an example, the video processor circuit 106 receives image information from the image sensor 107 and, by applying artificial intelligence processing, such as including applying a neural network-based analysis for feature extraction from the image information, the video processor circuit 106 can detect one or more objects in a sequence of images. The video processor circuit 106 can classify objects as one or more of a human, pet, plant, smart robot like a vacuum cleaner, or as some other household or office device that is known or expected to move around, such as in a predefined or specified area or zone. In an example, the video processor circuit 106 can track each object in a sequence of images to detect motion of each object. In an example, if the detected object is a human being, then the video processor circuit 106 can perform a face recognition algorithm to identify the particular human being who is present in the environment, such as by comparing facial attributes of the detected person with a database of known faces. For example, the database can include or use face information for family members, friends, etc., as configured by a system owner, so that the system 100 can efficiently detect them whenever an image is captured. The system 100 can be configured to follow various rules that define response behaviors to various detected and classified objects. For example, an end user or system owner can be automatically notified when a particular object or type of motion is detected in the monitored environment. In an example, a push notification to a user's mobile device can be provided. In an example, detection events that can trigger an alert can include, among other things, an unknown person or face, a human whose face is masked or is not visible, etc. In an example, the system 100 can be configured to identify, or can implement artificial intelligence to learn about, various objects that are permitted such as pets and robots, for example when such objects are in a defined zone or portion of the monitored environment.

In an example, the audio processor circuit 104 can, substantially concurrently with the processing and analysis by the video processor circuit, process audio information from one or more users, either locally or using the remote server 108. Thereafter, the first processor circuit 102 and/or the remote server 108 can combine information about the recognized video data with the audio data to decipher user requests and actions, and automatically service one or more user requests.

In an example, the first processor circuit 102 can perform a voice recognition algorithm on audio signals received from the audio sensor 105. Voice recognition can include identifying a person from a characteristic of his or her voice. Voice recognition can be used to determine who is speaking and/or to determine what is being said. Identification of a person who is speaking can be referred to as "speaker recognition" and identification of what is being said can be referred to as "speech recognition". In an example, recognizing a speaking individual can simplify the task of translating speech in systems that have been trained on a specific individual's voice, or it can be used to authenticate or verify a speaker's identity. Speaker verification seeks to determine a 1:1 match where one speaker's voice is matched to one template whereas speaker identification seeks to determine a match from among N voice templates. In an example, a recognition system can include two phases: enrollment and verification. During enrollment, an individual's voice is recorded and voice features (e.g., frequency components) are extracted to form a voice print, template, or model. In the verification phase, a speech sample or "utterance" is compared against a previously created voice print. For identification systems, the utterance is compared against multiple voice prints to determine a best match, while verification systems compare an utterance against a single voice print. In an example, the audio processor circuit 104 can authenticate a user and can check for permission to put the device in one or more different modes, such as including a monitoring mode. In the monitoring mode, the system 100 can use the image sensor 107, the audio sensor 105, and the first processor circuit 102 to detect objects in the environment, capture motion information about the detected objects, track and classify objects in the environment, and detect and recognize sounds. In response, the first processor circuit 102 can use a rules-based framework to determine whether to sound an alarm or alert a particular system operator or user. In an example, the rules-based framework includes using a combination of data from one or more auxiliary sensors that are configured to transmit information to the system 100.

Figure 2:
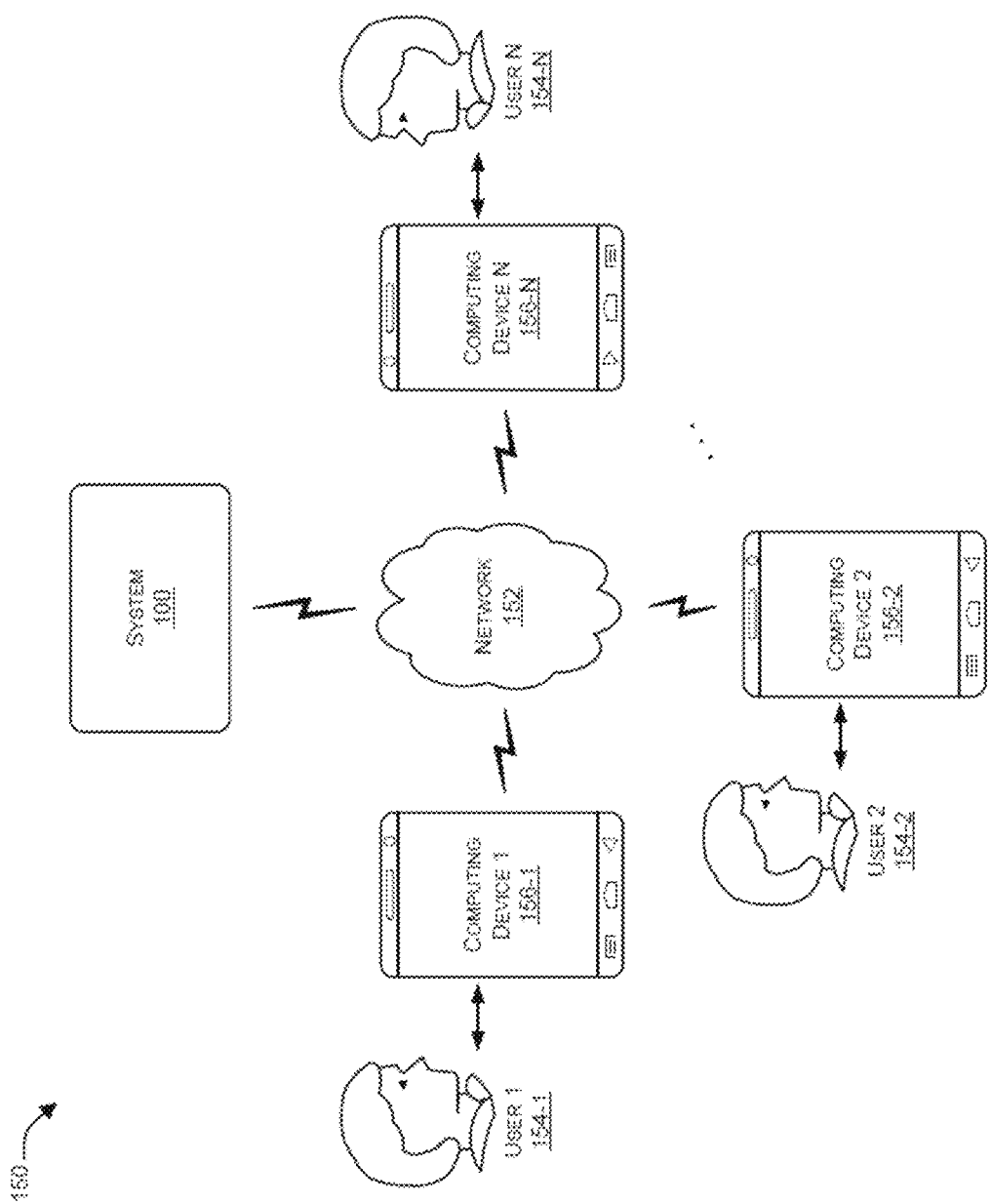
FIG. 2 illustrates generally an example of the system of FIG. 1 in communication with various computing devices.

FIG. 2 illustrates generally an example of the system 100 in communication with various computing devices 156-1, 156-2, ..., 156-N (collectively referred to herein as computing devices 156 and individually referred to as computing device 156 hereinafter), such as using a second network 152. The system 100 can be implemented using any or a combination of hardware components and software components, such as those discussed above in the discussion of FIG. 1, or can be implemented using another security device, computing system and the like, such that embodiments of the present disclosure can be used for monitoring or surveillance purposes.

In an example, the system 100 can interact with users 154-1, 154-2, ..., 154-N (collectively referred to herein as users 154 and individually referred to as user 154 hereinafter), through the computing devices 156 or through applications residing on the computing devices 156. In an example, the system 100 can be accessed by applications residing on any operating system, including but not limited to Android, iOS, and the like. Examples of the computing devices 156 can include, but are not limited to, a portable computer, a personal digital assistant, a handheld device, a smart phone, and a workstation. In an example, the computing devices 156 are mobile phones of the respective users 156. Further, the computing devices 156 can be any or a combination of a hardware or a software implementation that can perform monitoring and surveillance of a place or a zone such as personal computers of users, applications residing on computing devices, computing devices of public authorities or enterprises, and the like. Similarly, users 154 can also be individuals, organizations, government bodies, etc., such as can use monitoring and surveillance capabilities.

The second network 152, which can comprise a portion of the network 110 from the example of FIG. 1, can include a wireless network, a wired network or a combination thereof that can be implemented as one of the different types of networks, such as the Intranet, a Local Area Network (LAN), a Wide Area Network (WAN), and the like. The second network 152 can be a dedicated network or a shared network. In an example, a shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like. In an example, alerts or notifications generated by the system 100 can be communicated to the computing devices 156 of the users 154 using the second network 152.

In an example, an audio assistant (or smart speaker) or other office computer devices primarily microphones and speakers. These devices can process audio commands and determine user actions and requirements along with other types of inputs. Sometimes, an audio assistant operates without video or visual understanding or processing. Such an assistant device will not visually understand a scene or room, a name of an individual issuing a command, context clues, and more. Processing or decision making without visual clues introduces inherent limitations, such as in terms of safety and security. In an example, an audio assistant can be augmented with video information and attendant processing to make the augmented device smarter in interaction, personalization, office business processes, productivity and communication tools, and authentication.

In an example, an intelligent visual image sensor can be added to an audio-only, microphone-based assistants or any smart speaker. The combined device can provide a rich set of visual understanding and use cases. Using information from both audio and video sensors, the data gathered can enable better understanding of who an individual is who is issuing commands, what commands to process, and can in some cases obviate a need for an "action key word" or trigger word. In an example, the combined device can be face aware, meaning that it can recognize a user by his or her facial features rather than by a voice command or auditory signature alone. Thus the device can provide enhanced user authentication over an audio-only device. In an example, the combined device can be configured to monitor an environment to determine who is entering or exiting a particular environment. In an example, the combined device can be configured to determine who is speaking or performing an activity or movement, and information about such spoken information or activity or movement can be recorded, such as together with information about the individual performing such action. In an example, the device can use audio-based clues or information to identify movement, such as using information about audio signal frequency or amplitude changes over time. Information from an image sensor can be used to augment the movement identification, such as by associating objects or object movements with the detected changes in an audio signal. In an example, the combined device can be configured to correlate face recognition and voice recognition algorithms for enhanced security and user personalization of attendant systems. Other uses are similarly enabled.

Figure 3:
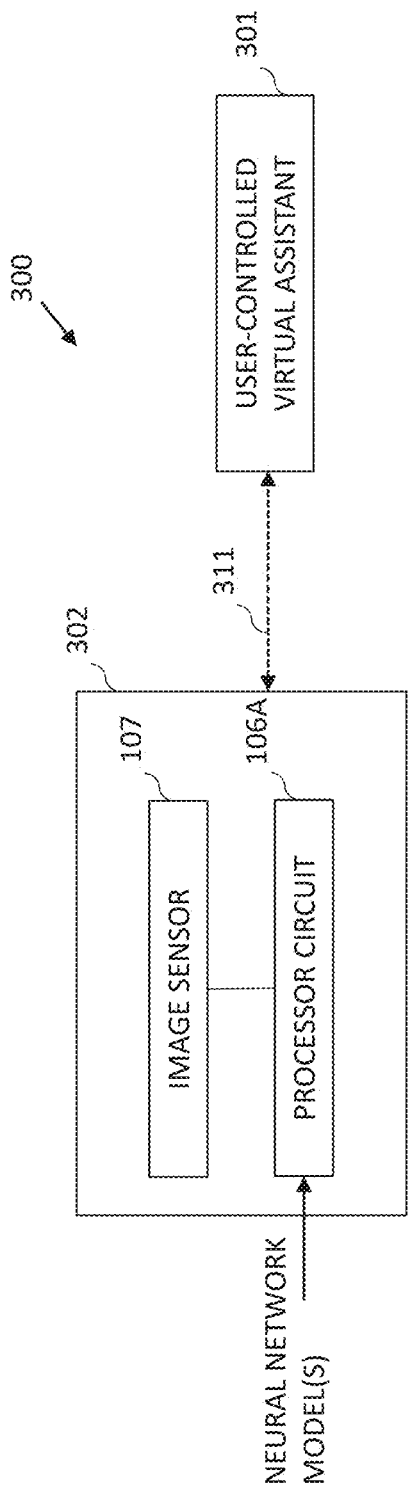
FIG. 3 illustrates generally an example of a system that includes a user-controlled virtual assistant (UCVA) in communication with an apparatus for augmenting one or more functions of the UCVA.

FIG. 3 illustrates generally an example of a system 300 that includes a user-controlled virtual assistant 301 (UCVA 301) in communication with an apparatus 302 for augmenting one or more functions of the UCVA 301. The apparatus 302 can include the image sensor 107 from the example of FIG. 1, and can further include a processor circuit 106A. The processor circuit 106A can be the video processor circuit 106 from the example of FIG. 1, or can be a general purpose or other processor circuit. The processor circuit 106A is configured to include or receive one or more neural network models that the circuit can apply using deep learning such as together with information from the image sensor 107 to identify objects, humans, or other features in an environment monitored by the image sensor 107.

In an example, the UCVA 301 includes a voice-controlled assistant such as a "smart speaker" that includes at least one microphone (such as the audio sensor 105) for receiving audible commands from a user and, optionally, includes a speaker (such as the speaker 112) for communicating information or responses to the same or other user.

The example of FIG. 3 includes an interface 311 that couples the UCVA 301 with the apparatus 302. In an example, the interface 311 couples the processor circuit 106A and another processor circuit on-board the UCVA 301. The interface 311 can be a hardware interface, such as including one or more electrical, optical, or other transmission channels, that communicates data unidirectionally or bidirectionally between the apparatus 302 and the UCVA 301. In an example, the interface 311 can be a software interface, such as including one or more software programs, algorithms, or protocols that communicates data unidirectionally or bidirectionally between the apparatus 302 and the UCVA 301. In an example, the interface 311 includes or uses the internet or a cloud server or other remote computer system or server. That is, information from one of the apparatus 302 and the UCVA 301 can be sent to the other using a remote server. In an example, the remote server can perform some or all of the video and/or audio processing and can generate instructions for one or more of the apparatus 302 and the UCVA 301 to respond.

Figure 4:
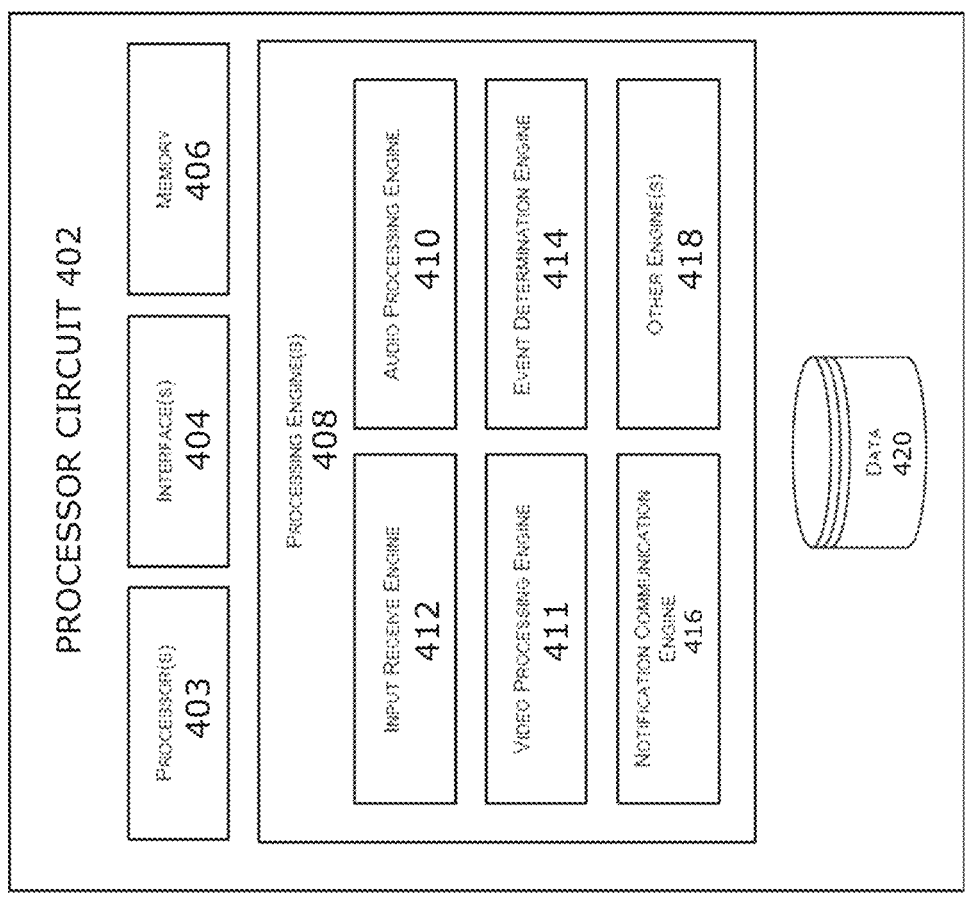
FIG. 4 illustrates generally an example of a processor circuit.

FIG. 4 illustrates generally an example of a processor circuit 402. The processor circuit 402 can comprise all or a portion of one or more of the other processor circuits discussed herein, such as the first processor circuit 102, the audio processor circuit 104, the video processor circuit 106, the processor circuit 106A from the example of FIG. 3, or one or more other processors or circuits. In an example, the processor circuit 402 can include one or more processor(s) 403 or processor cores. The one or more processor(s) 403 can be implemented as one or more microprocessor circuits, microcomputers, microcontrollers, digital signal processor circuits, central processor circuits, logic circuitries, and/or any devices that manipulate data based on operational instructions. Among other capabilities, the one or more processor(s) 403 are configured to fetch and execute computer-readable instructions stored in a memory 406. The memory 406 can store one or more computer-readable instructions or routines, which can be fetched and executed to create or share the data units over a network service. The memory 406 can comprise any non-transitory storage device including, for example, volatile memory such as RAM, or nonvolatile memory such as EPROM, flash memory, and the like.

The processor circuit 402 can comprise an interface(s) 404. The interface(s) 404 can comprise a variety of interfaces, for example, interfaces for data input and output devices, referred to as I/O devices, storage devices, and the like. The interface(s) 404 can facilitate communication of the processor circuit 402 with various devices coupled to the processor circuit 402 such as an input device and an output device. The interface(s) 404 can also provide a communication pathway for one or more components of the processor circuit 402. Examples of such components include, but are not limited to, various other processing circuits or engine(s) 418 and data 410.

The processing engine(s) 418 can be implemented as a combination of hardware and programming (for example, programmable instructions) to implement one or more functionalities of the processing engine(s) 418. In examples described herein, such combinations of hardware and programming can be implemented in different ways. For example, the programming for the processing engine(s) 418 can be processor executable instructions stored on a non-transitory machine-readable storage medium and the hardware for the processing engine(s) 418 can comprise a processing resource (for example, one or more processor circuits), to execute such instructions. In some examples, the machine-readable storage medium can store instructions that, when executed by the processing resource, implement the processing engine(s) 418. In such examples, the processor circuit 402 can comprise the machine-readable storage medium storing the instructions and the processing resource to execute the instructions, or the machine-readable storage medium can be separate but accessible to processor circuit 402 and the processing resource. In other examples, the processing engine(s) 418 can be implemented by other electronic circuitry.

The data 420 can comprise data that is either stored or generated as a result of functionalities implemented by any of the components of the processing engine(s) 418. In an example, the processing engine(s) 418 can comprise an input receive engine 412, an audio processing engine 410 (e.g., comprising the audio processor circuit 104), a video processing engine 411 (e.g., comprising the video processor circuit 106), an event determination engine 414, a notification communication engine 416, and other engines(s) 418.

In an example, the input receive engine 412 receives input data from an input device, such as from the audio sensor 105 and/or from the image sensor 107. The input data includes a sequence of images of a video stream and associated audio signals, such that the input data can be processed for the purposes of monitoring and surveillance. In an example, the audio processing engine 410 and the video processing engine 411 can process the audio signals and the video stream respectively. The video processing engine 411 can extract feature data from the input data to detect one or more objects in the respective images of the video stream. Those skilled in the art would appreciate that the feature data can be extracted substantially in real-time with capture of said sequence of images to improve efficiency of the system.

In an example, the video processing engine 411 can perform processing to extract features of a still image or of a series of images to detect objects and determine shape and size information about one or each object in a particular image. In an example, the feature extraction can be a type of dimensionality reduction that efficiently represents parts of an image as a compact feature vector. In an example, a reduced feature representation can be used to quickly complete tasks such as image matching and retrieval. Feature detection, feature extraction, and matching can be combined to perform object detection and recognition, content-based image retrieval, face detection and recognition, or texture classification.

In an example, object detection in one or more images can be performed by the video processing engine 411 using a deep learning model. Deep learning can include a artificial intelligence processing technique that learns tasks and feature representations from image and video data and, in an example, is implemented using neural networks such as Convolutional Neural Networks (CNNs). A deep learning model can be used to locate or classify one or more objects in images and video streams. In an example, using a deep learning-based object classifier, the video processing engine 411 can categorize detected objects. The categories can include, but are not limited to, humans, pets, plants, devices, and the like. Though techniques for feature extraction and object detection are explained herein as including or using a deep learning model, any other suitable technique for feature extraction and object detection can similarly be used.

In an example, when a detected object is determined by the video processing engine 411, or by another processor, to be a human, then the video processing engine 411 can perform a face recognition algorithm, such as using deep learning and neural networks, to identify the human. The face recognition technique can identify or verify the human in an image such as by comparing facial features from the image with faces stored within a database, which in some examples can be configured by a user. For example, known faces of family members, staff members, friends, etc. can be stored by a user in a database such that these known faces can be recognized by the video processing engine 411. In an example, the video processing engine 411 can determine face information and various facial features, angle or look direction of a human, and mood of a human. In an example, the video processing engine 411 can determine a number of people, objects, or other features in a monitored environment. In an example, the video processing engine 412 can determine various activities of one or more inhabitants of the monitored environment using its deep learning or other artificial intelligence capabilities.

In an example, the video processing engine 411 can track one or more detected objects in a sequence of image or frames to determine motion of the detected objects. To perform tracking, the video processing engine 411 can analyze sequential images and can provide information about changes or movement of the objects among the images. In an example, the video processing engine 411 can perform target representation and localization, filtering, and/or data association to perform object tracking. The video processing engine 411 can optionally determine attributes or characteristics of each detected object, for example including but are not limited to shape, size, color, and the like.

In an example, the audio processing engine 410 can process audio commands received or detected by the audio sensor 105. In an example, the audio commands are selected to cause the system 100 to operate in an assistant mode or a monitoring mode. In an assistant mode, the system 100 can be configured to perform tasks or services for a user such as by using natural language processing (NLP) to match a user voice input to executable commands and can provide an audible response to the user through an output device such as the speaker 112, or provide some other system response. The audio processing engine 410 can continually learn using artificial intelligence techniques including machine learning and deep learning.

In a monitoring mode, the system 100 can perform tasks such as environment monitoring or surveillance. In an example, changing the operating mode of the system 100 can be performed when a designated or authenticated user provides instructions to change the mode. In an example, user authentication can include a combination of voice recognition by the audio processing engine 410 and face recognition by the video processing engine 411. In an example, the system 100 can automatically configure itself to operate in a monitoring mode based on detection of the one or more objects. For example, if a designated user is not detected by the system 100 for a pre-configured duration of time, or during a specified interval, then the system 100 can automatically enter the monitoring mode. That is, when the designated user is away, the system 100 can set itself to operate in the monitoring mode. In an example, a user can schedule the system 100 to operate in the monitoring mode for a fixed time during a day. For example, the system 100 can be placed into the monitoring mode during specified away-times, such as 9:00 a.m. to 5:00 p.m. to coincide with a workday.

In an example, the event determination engine 414 can be used to determine an event by comparing attributes of one or more detected objects or audio events with pre-defined rules, such that when an event is determined a notification can be sent to the user using the notification communication engine 416. For example, a rule can be defined for a particular object that if the particular object is not detected in an image, then the particular object can be termed as a "missing object" and a notification can be sent to a user using the notification communication engine 416. In an example, the audio processing engine 110, the video processing engine 112, and the event determination engine 214 can be used together to determine, e.g., missing objects, intrusion by an unidentified person, or other events that can trigger a notification to a user.

In an example, the notification communication engine 416 can be configured to notify various users based on a set of rules defined for each respective user. For example, if the system 100 is used by three users, user A, user B and user C, separate rules can be defined for each user so that the notifications can be sent to designated ones of the users only.

In an example, the system 100 can notify a user about detected unusual or abnormal visual events. For example, the system 100 can detect an intrusion into a designated zone or can determine if an individual is loitering or remaining in a particular zone for greater than a specified threshold time duration. In an example, the system 100 is configured to determine names or other information about detected individuals, if the system 100 is pre-configured with such information, and/or to label individuals or objects as unknown. In an example, the system 100 can detect and notify a user about regular events, for example, the system 100 can alert a user when a package or box or ecommerce delivery or mail is detected in a particular location in a field of view. In an example, system 100 can be used to notify a user about movements or activities of a pet.

In an example, the system 100 can detect and classify objects and provide appropriate notifications to a user. For example, an alert such as "Human motion detected" can be sent to a computing device of the user. In an example, the system 100 can send an alerts with corresponding video and/or sound information captured by the audio sensor 105 and/or the image sensor 107. In an example, the system 100 can have an Application Programming Interface (API) that can be used to push alerts so that a user monitoring the home, office, or any other defined pace or zone can remotely monitor and can notify appropriate authorities in an emergency situation. The system 100 can maintain a log by storing these alerts or notifications and associated video clips and sounds so that they can be reviewed later.

Figure 5A:
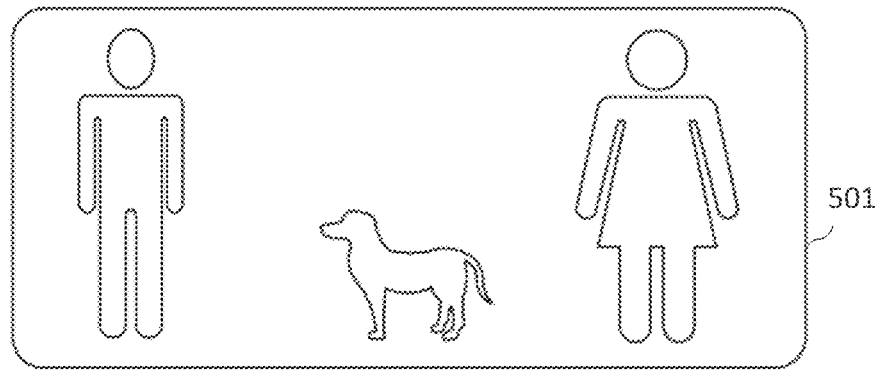
FIGS. 5A-5C illustrate generally an example of a visual recognition process.
Figure 5B:
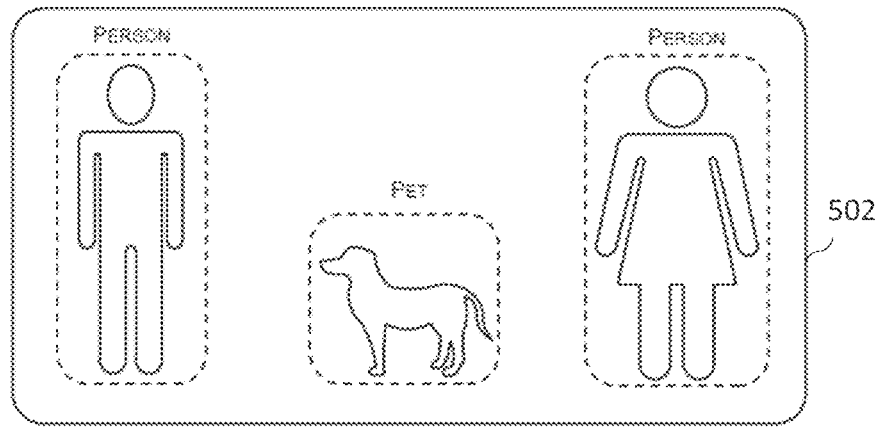
Figure 5C:
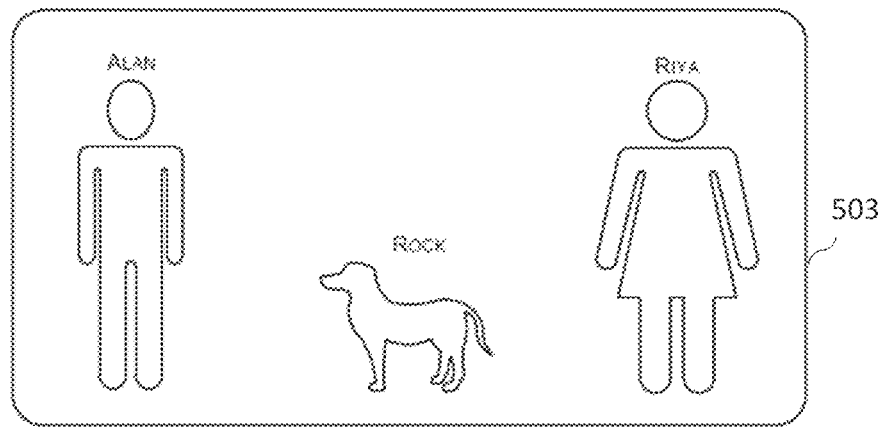

FIGS. 5A-5C illustrate generally an example of a visual recognition process that can be performed using the system 100 from the example of FIG. 1. In an example, the system 100 can receive an image 501 using the image sensor 107. The system 100 can use the first processor circuit 102 to perform feature extraction on the image 501 to detect one or more objects in the captured image and can optionally classify the detected objects to provide a classified image 502. In an example, the system 100 can determine that two persons and a pet are present in the image 501, as illustrated in FIG. 5B. In an example, the system 100 can compare detected attributes of the objects or apply a rules-based analysis to further classify or determine information about the objects and to provide a further classified image 503. For example, the detected pet object can be analyzed to determine that the name of the pet is "Rock". In an example, the system 100 can perform face recognition to determine names of the person objects in the captured image. In an example, the system 100 can communicate information about the classified image 502 and/or about the further classified image 503 to a user.

Figure 6A:
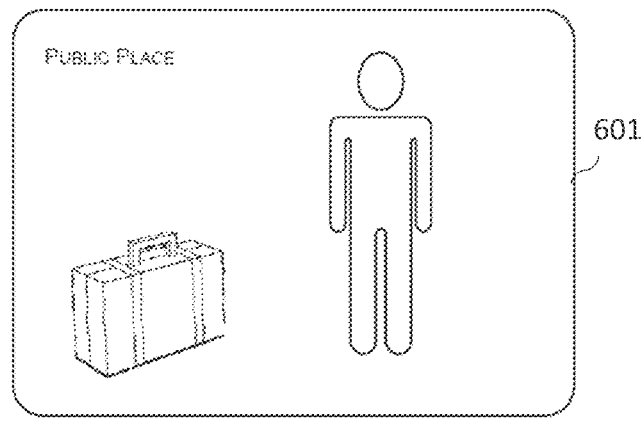
FIGS. 6A-6C illustrate generally an example of a visual recognition process.
Figure 6B:
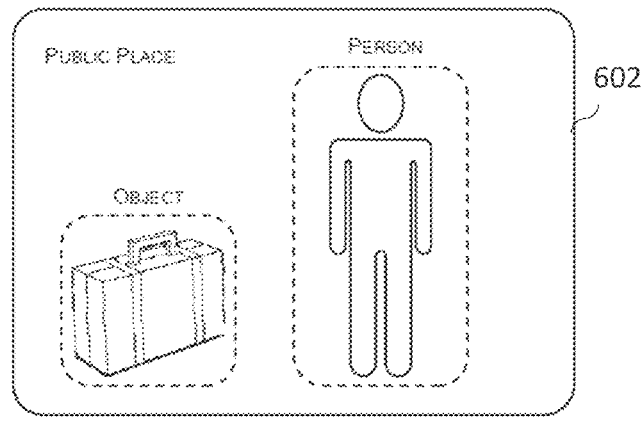
Figure 6C:
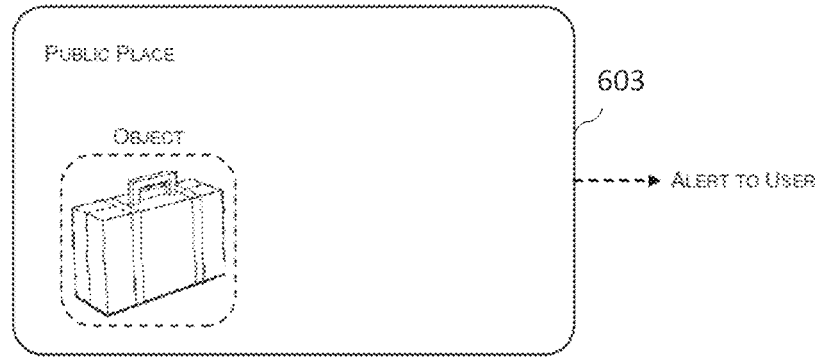

FIGS. 6A-6C illustrate generally an example of a visual recognition process that can be performed using the system 100 from the example of FIG. 1. In an example, the system 100 can receive a second image 601 using the image sensor 107, such as to receive an image from a public place. The system 100 can use the first processor circuit 102 to perform feature extraction on the second image 601 to detect one or more objects in the captured image and can optionally classify the detected objects to provide a second classified image 602. In an example, the system 100 can determine that one person and another object are present in the second image 601, as illustrated in FIG. 6B. In an example, the system 100 can compare detected attributes of the objects or apply a rules-based analysis to further classify or determine information about the objects and to provide a second further classified image 603. For example, the system 100 can determine that the object remains in the environment but the detected person is absent. Various user-specified rules can be followed by the system 100 to determine how to respond to such a sequence of events. In an example, if the system 100 determines that the object is not a known or permitted object, and/or if the object remains stationary for greater than a specified threshold amount of time, then an alert can be generated such as to sound an alarm, notify another user, or other responsive action can be taken.

Figure 7A:
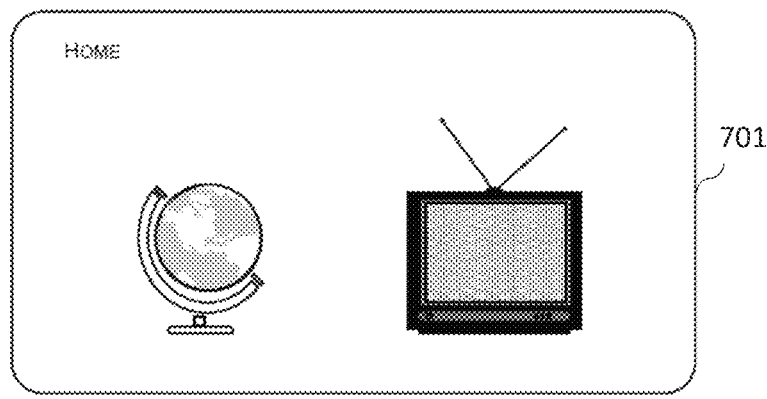
FIGS. 7A-7C illustrate generally an example of a visual recognition process.
Figure 7B:
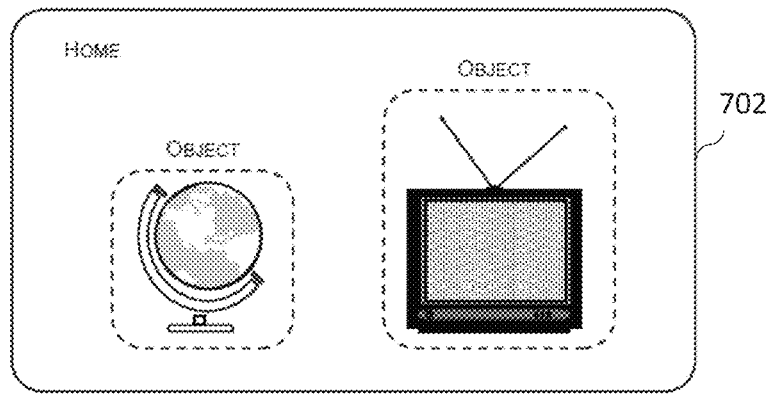
Figure 7C:
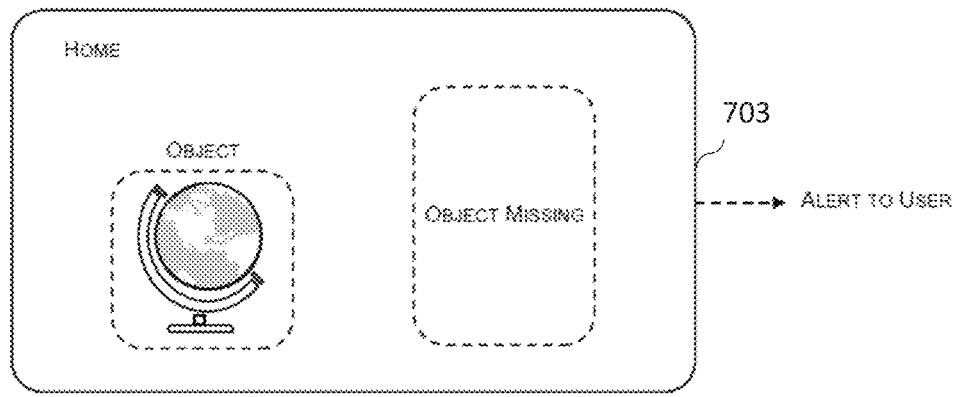

FIGS. 7A-7C illustrate generally an example of a visual recognition process that can be performed using the system 100 from the example of FIG. 1. In an example, the system 100 can receive a third image 701 using the image sensor 107, such as to receive an image from a home. The system 100 can use the first processor circuit 102 to perform feature extraction on the third image 701 to detect one or more objects in the captured image and can optionally classify the detected objects to provide a third classified image 702. In an example, the system 100 can determine objects that are present in the third image 701, as illustrated in FIG. 7B. In an example, the system 100 can compare detected attributes of the objects or apply a rules-based analysis to further classify or determine information about the objects and to provide a third further classified image 703.

In an example, the system 100 can determine that an object was removed or is missing from the environment. Various user-specified rules can be followed by the system 100 to determine how to respond to such a sequence of events. In an example, if the system 100 determines that the object is permitted to move outside of a predefined or specified zone or region, then no responsive action can be taken. If, however, the system 100 determines that the object should be stationary or if the system is preconfigured to track the particular object or asset, then an alert can be generated such as to sound an alarm, notify another user, or other responsive action can be taken.

Figure 8:
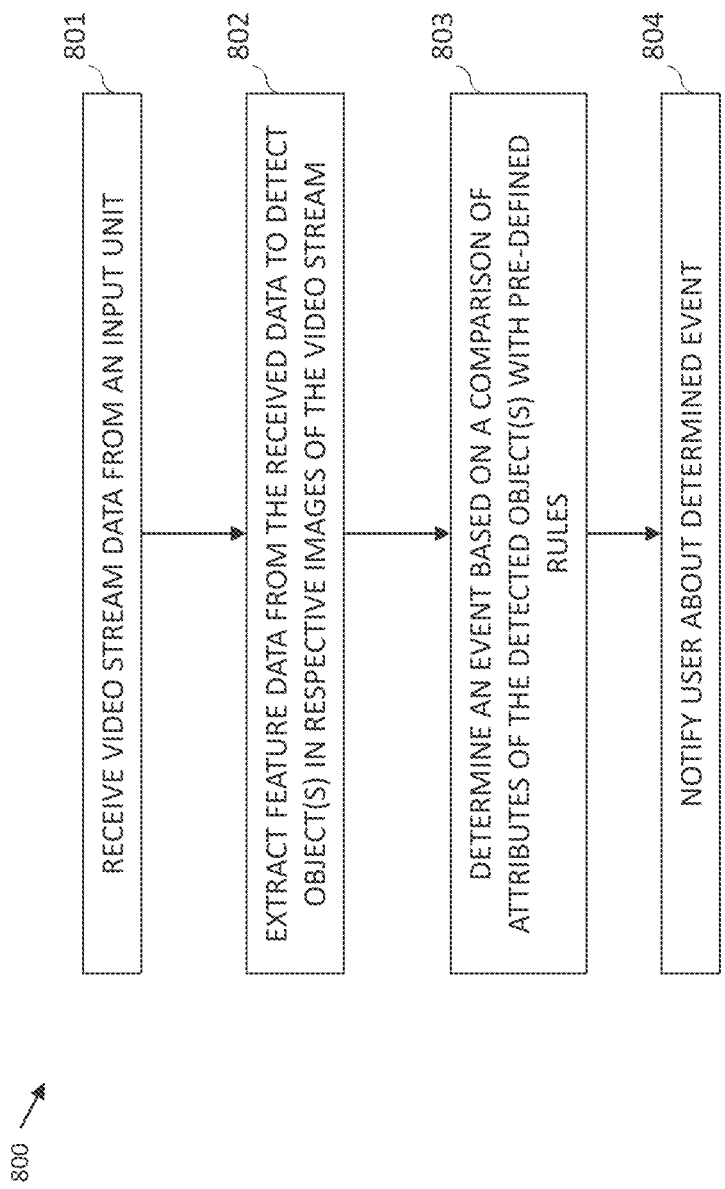
FIG. 8 illustrates generally an example of a first method that can include determining an event from video stream data.

FIG. 8 illustrates generally an example of a first method 800 that can include determining an event from video stream data using the system 100 from the example of FIG. 1. In an example, at step 801, the first method 800 includes receiving video stream data from an input unit. The input unit can include the image sensor 107 or other image or video receiver, or data receiver, that can receive image data over time about one or more environments. In an example, the video stream data includes multiple frames of information about an environment. In an example, the video stream data includes audio information received from the audio sensor 105, such as concurrently with the image data.

At step 802, the first method 800 can include extracting feature data, or attributes, from the video stream data received at step 801. Step 802 can include detecting whether one or more objects is present in respective images of the video stream. The feature data can be extracted substantially in real-time with capture of the input data such that there is minimal time lag between receiving an input image and detecting or identifying objects in the image.

At step 803, the first method 800 can include determining an occurrence of an event based on a comparison of attributes of one or more detected objects with various rules. For example, step 803 can include determining whether a particular user or object is present or absent in the scene as described in, for example, FIGS. 5A-5C. Step 803 can include determining whether a particular user or object is permitted or not permitted to be in a particular zone or region as described in, for example, FIGS. 6A-6C. In an example, Step 803 can include determining whether a particular user or object was removed from the scene as described in, for example, FIGS. 7A-7C.

At step 804, the first method 800 can include notifying a user about an event determined at step 803. For example, when the first method 800 includes determining, at step 803, that an unauthorized person is present in a monitored area, then step 804 can include sounding an alarm or notifying a particular user. Step 804 can optionally include sending information to the user about the determined event, such as sending video and/or audio information from the scene to the user.

In an example, the system 100, the apparatus 302, and/or the UCVA 301 can be configured to service various user requests and tasks, such as using combined visual recognition of individuals and verbal or audible cues. Some examples of specific user requests and tasks are discussed below.

Figure 9:
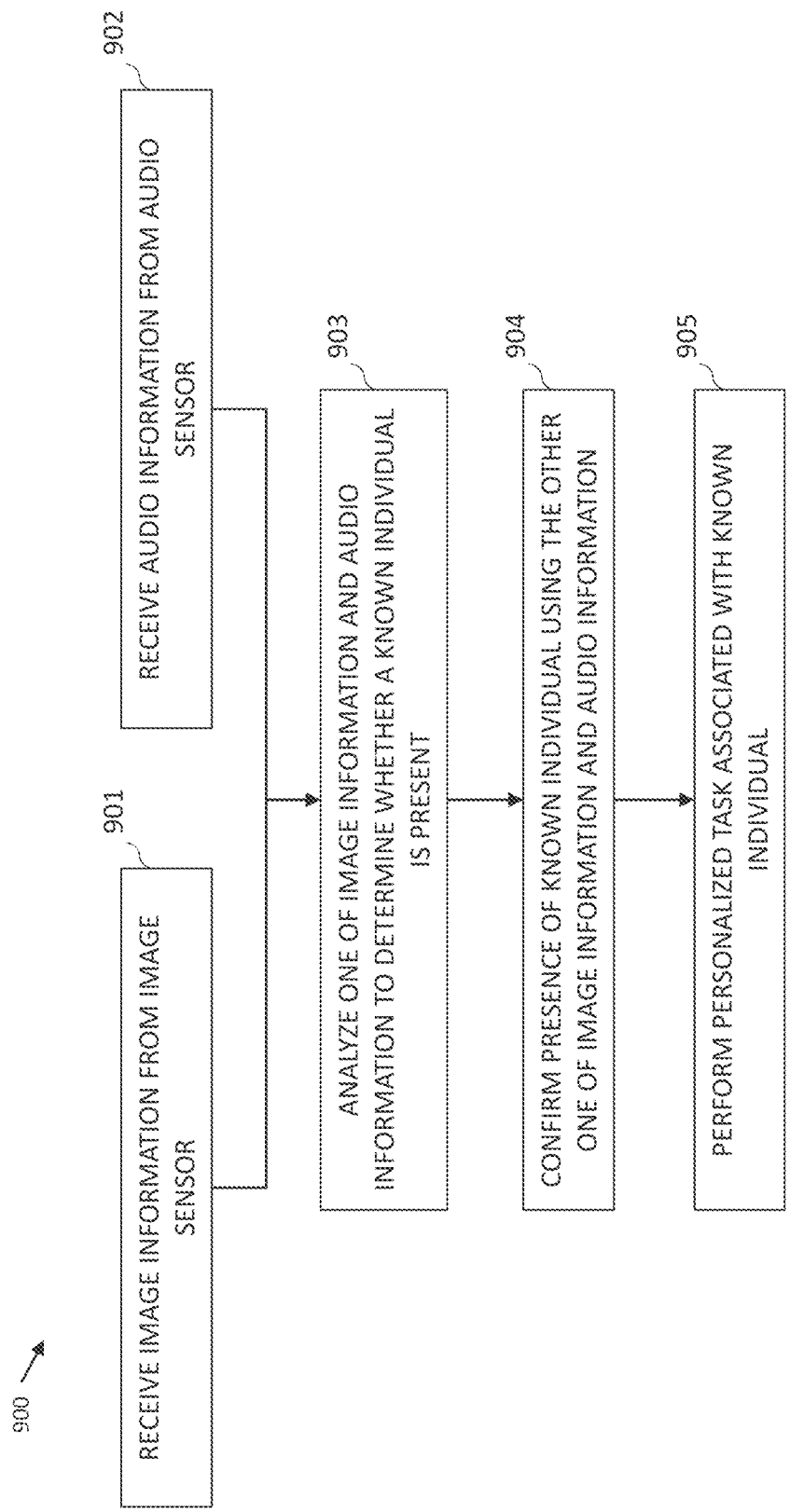
FIG. 9 illustrates generally an example of a second method that can include using image information and audio information together to perform a personalized task for a user.

FIG. 9 illustrates generally an example of a second method 900 that can include using image information and audio information together to perform a personalized task for a user. In an example, at step 901, the second method 900 can include receiving image information from an image sensor or camera such as the image sensor 107 from the example of FIG. 1. Step 902 can include receiving audio information from an audio sensor or microphone such as the audio sensor 105 from the example of FIG. 1.

At step 903, the second method 900 can include using the first processor circuit 102 to analyze one of the image information received at step 901 or the audio information received at step 902 to determine whether a known individual is present in an environment that is monitored by the audio sensor 105 and the image sensor 107. In an example, step 903 includes using the first processor circuit 102 to apply deep learning-based machine-implemented techniques for recognizing an individual or providing an indication of a likelihood that an individual in the environment is a particular known individual or is an unrecognized individual.

At step 904, the second method 900 can include confirming a presence of the particular known individual using the other one of the image information received at step 901 and the audio information received at step 902. That is, if step 903 includes analyzing the image information to determine whether the known individual is present then step 904 includes using audio information to confirm the presence of the known individual. If, on the other hand, step 903 includes analyzing the audio information to determine whether the known individual is present then step 904 includes using image information to confirm the presence of the known individual.

Following confirmation of the presence of the known individual at step 904, the second method 900 continues at step 905 with performing a personalized task associated with the known individual. In an example, the personalized task includes accessing an address book or contact list associated with the known individual, and then performing one or more user-specified tasks using the accessed address book or contact list for the user. In an example, the personalized task includes greeting the known individual by name, or adjusting one or more environment pre-sets according to preferences previously established by or learned about the known individual. In an example, the personalized task includes book an appointment for the known individual or placing an order and using or debiting a particular account associated with the known individual. Various other automatic personalized responses or tasks can be performed at step 905.

Figure 10:
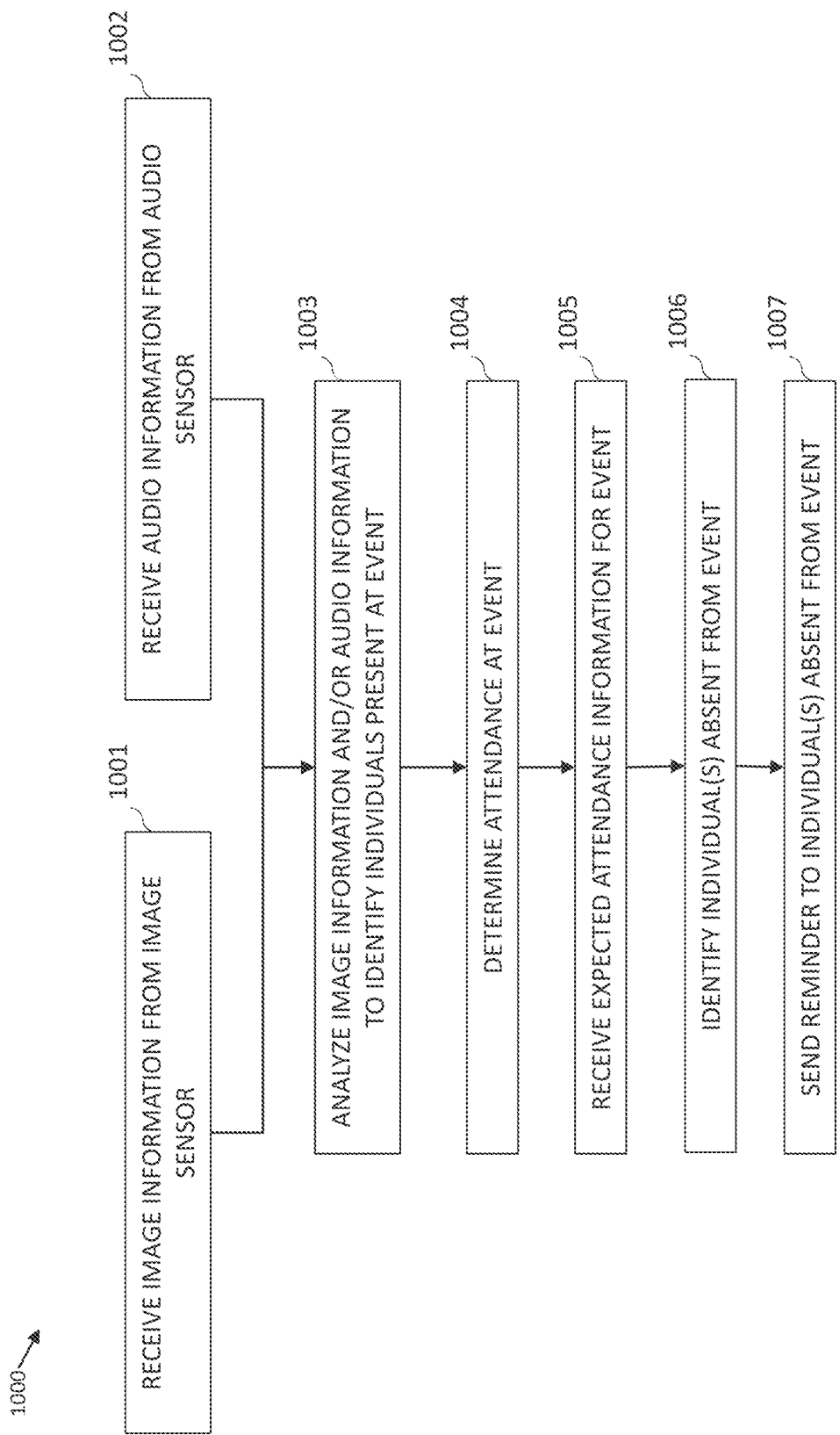
FIG. 10 illustrates generally an example of a third method that can include using image information and audio information together to determine information about one or more attendees at an event.

FIG. 10 illustrates generally an example of a third method 1000 that can include using image information and audio information together to determine information about one or more attendees at an event. In an example, at step 1001, the third method 1000 can include receiving image information from an image sensor or camera such as the image sensor 107 from the example of FIG. 1. Step 1002 can include receiving audio information from an audio sensor or microphone such as the audio sensor 105 from the example of FIG. 1.

At step 1003, the third method 1000 can include using the first processor circuit 102 to analyze the image information received at step 1001 or the audio information received at step 1002 to identify the individuals present at the event. In an example, step 1003 includes using the first processor circuit 102 to apply deep learning-based machine-implemented techniques for recognizing individuals in images or through audio associated with the individuals, or providing an indication of a likelihood that an individual in the environment is a particular known individual or is an unrecognized individual. Step 1004 can include determining an attendance at the event, such as based on the identified individuals from step 1003, and can include compiling a list of recognized individuals.

In an example, step 1005 can include receiving expected attendance information about the event. In an example, the expected attendance information can be accessed from a memory that is locally available to the first processor circuit 102, or the expected attendance information can be accessed from the remote server 108. In an example, the expected attendance information is accessed from a calendar of one of the individuals who was identified at step 1003 to be present at the event.

Step 1006 can include identifying whether any individual who is absent from the event but who was expected to attend the event. For example, information about the attendance as determined at step 1004 can be compared with the expected attendance information received at step 1005 to identify the absent individual. Step 1007 can include sending a reminder about the event to the identified absent individual.

Figure 11:
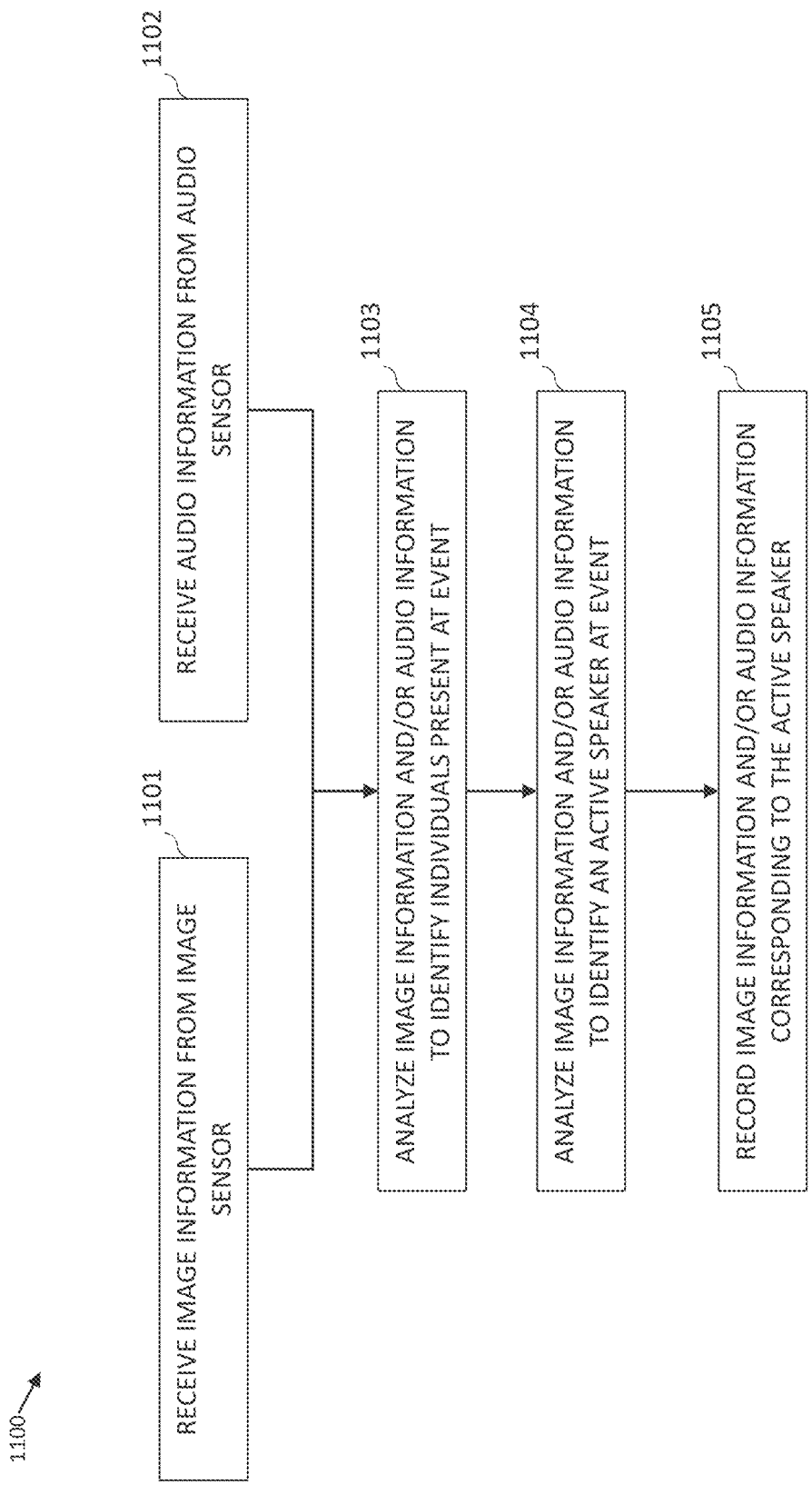
FIG. 11 illustrates generally an example of a fourth method that can include using image information and audio information together to determine information about one or more attendees at an event.

FIG. 11 illustrates generally an example of a fourth method 1100 that can include using image information and audio information together to determine information about one or more attendees at an event. In an example, at step 1101, the fourth method 1100 can include receiving image information from an image sensor or camera such as the image sensor 107 from the example of FIG. 1. Step 1102 can include receiving audio information from an audio sensor or microphone such as the audio sensor 105 from the example of FIG. 1. In an example, the image information and/or the audio information can be recorded, such as locally or in a remote memory such as the remote server 108.

At step 1103, the fourth method 1100 can include using the first processor circuit 102 to analyze the image information received at step 1101 or the audio information received at step 1102 to identify the individuals present at the event. In an example, step 1103 includes using the first processor circuit 102 to apply deep learning-based machine-implemented techniques for recognizing individuals in images or through audio associated with the individuals, or providing an indication of a likelihood that an individual in the environment is a particular known individual or is an unrecognized individual.

In an example, the fourth method 1100 includes, at step 1104, analyzing the image information and/or the audio information to identify an active speaker at the event. That is, step 1104 can include determining that an individual at the event is speaking and using the first processor circuit 102 to determine which of the present individuals is the one who is speaking. At step 1105, the example can include recording image information and/or audio information corresponding to the active speaker. In an example, the recorded information can be later retrieved, for example, with an inquiry from a user to retrieve information about what a particular specified individual said during the event.

In an example, step 1103 and/or 1104 can include determining one or more of facial angles, facial features, facial moods, and look directions of one or more participants, such as using the video processor circuit 106 to apply motion detection and face recognition algorithms. That is, the video processor circuit 106 can be configured to analyze the image information received at step 1101 to determine the a of participants present at the group event, particular ones of participants that are talking, particular ones of the participants who are moving, directions in which participants are looking, and objects at which the participants are looking.

In an example, step 1104 and/or 1105 can include using the video processor circuit 106 to save a video of an individual speaking at the group event, such as along with corresponding metadata that can include user name information, such as by first recognizing an individual who is talking, and then extracting a name corresponding to the recognized individual from the database 109. In an example, the video processor circuit 106 can display video of the user who is talking on the display 111, and can display a visual tag in the video with the individual name in correspondence with the talking individual.

Figure 12:
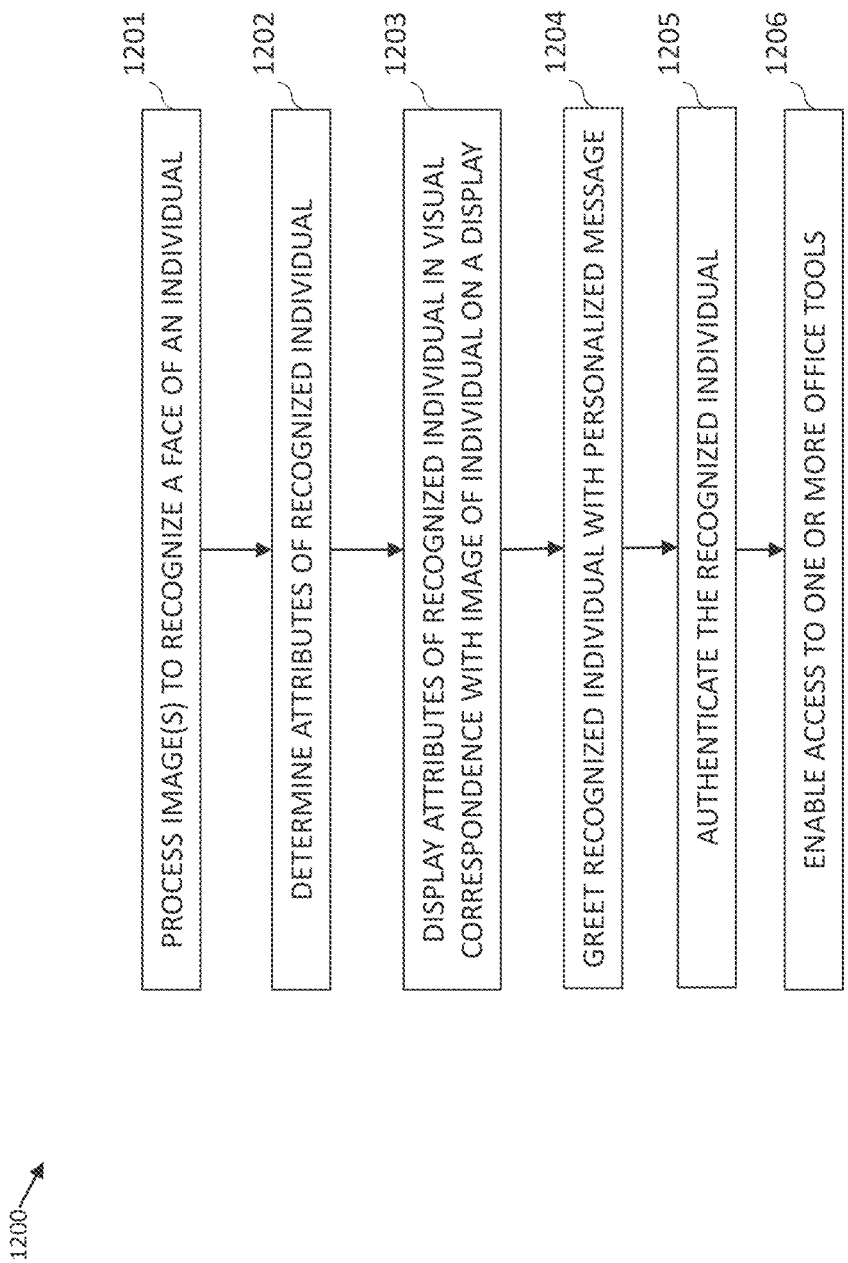
FIG. 12 illustrates generally an example of a fifth method that can include greeting a user using information received about the user from an image sensor.

FIG. 12 illustrates generally an example of a fifth method 1200 that can include greeting a user using information received about the user from the image sensor 107 and using the first processor circuit 102. In an example, the fifth method 1200 includes automatically authenticating and greeting the user based on facial recognition performed by the first processor circuit 102, such as using the apparatus 302 and/or the UCVA 301 from the example of FIG. 3.

In the example of FIG. 12, step 1201 includes using the first processor circuit 102 to process one or more images received from the image sensor 107 to determine whether a face of a known individual can be recognized. Step 1202 can include determining various attributes of the individual recognized at step 1201. For example, a name, address, authentication level of security clearance level, a role, title, permissions, or other descriptor or attribute of the individual can be determined. In an example, the attributes can be retrieved from a memory circuit that is locally available to the first processor circuit 102 or the attributes can be retrieved from the remote server 108.

In an example, the fifth method 1200 includes, at step 1203, using the display 111 to display the recognized face together, or in visual correspondence, with the attributes determined at step 1202. In an example, the fifth method 1200 can include using the system 100 as an automatic time clock. An attribute determined at step 1202 can include a time in or time out, corresponding to a time when the detected individual arrives at or departs from the monitored location. The step 1203 can include displaying the time in and/or time out information using the display 111.

In an example, the fifth method 1200 includes, at step 1204, greeting the recognized individual with a personalized or other custom message. For example, the recognized individual can be greeted with a message "Good morning John" when the attribute determined at step 1202 includes a name of the user being determined or recognized as 'John'. In an example, if the recognized individual approaches the image sensor 107 or another designated object, then step 1204 can include determining whether the individual was recently greeted and, if not, then the system greet the individual audibly using the speaker 112 and/or visually using the display 111.

In an example, the fifth method 1200 includes, at step 1205, authenticating the recognized individual. The authenticating can include determining whether the individual is permitted to access one or more office areas or office systems, such as when the monitored environment is a workplace or office environment. In an example, the system 100 can generate an error or alert if the face or name recognized as such does not match any authorized users of the system 100 or the environment. Thus, user authentication by face recognition can be performed such as additionally to a standard login/password or other non-visual mechanism, and can thus be deployed as a portion of a multifactor authentication process to enhance security and logging.

In an example, the fifth method 1200 includes, at step 1206, enabling or disabling access by the recognized individual to one or more office tools. In an example, if the recognized individual is authenticated at step 1205 and/or if the attributes determined at step 1202 indicate the individual is safe, then the system 100 can automatically enable access to one or more office productivity tools, such as sales forces, CRM/ERM, SAP, and intra-office communication tools for reporting, sharing information and other interaction. The recognized individual can be further enabled by the system 100 to check personalized common office devices available for them, thereby allowing for better sharing, experience and productivity. The recognized individual can be further enabled to create personalized work space, such as on devices that are not directly associated with the individual. In an example, the recognized individual can say something related to his or her personalized data in office automation, enterprise, reporting and management tools (such as CRM/ERM/Finance) and also share a virtual workspace with others.

In an example, the recognized individual can dictate a voice command such as "Give me a list of all open action items from this enterprise system", or "Create a report for me to share with Scott for the common customer contacts". The system 100 can resolve the name of the individual using audio information and/or image information and facial recognition, and detect the voice command to fetch the right data from the enterprise or office automation systems. If the name of the individual who provided the voice command was "John", then the system 100 can look for John's and Scott's customer contacts in salesforce, and create a report for John. The system 100 can generate the requested report by understanding the common workspace within a particular team.

FIG. 13 illustrates generally an example of a sixth method 1300 that can include automatically managing a calendar associated with a recognized individual. In an example, the sixth method 1300 includes, at step 1301, using the first processor circuit 102 to process one or more images received from the image sensor 107 to determine whether a face of a known individual can be recognized in the environment. If the information from the image sensor 107 includes a known or recognized individual, then the sixth method 1300 can continue to step 1302.

In an example, the sixth method 1300 includes, at step 1302, detecting an audio input from the recognized individual, such as an input received using the audio sensor 105 and processed by the first processor circuit 102. In an example, the system 100 can be configured to determine whether a correspondence between the audio input and the recognized individual exists. That is, the system 100 can be configured to authenticate that the audio input is from the same recognized individual, such as using one or more auditory characteristics or signatures that can be unique to the individual. Such auditory characteristics or signatures can include programmed or learned attributes, such as can be provided at the same time as a particular individual is enrolled as a known individual.

In an example, the sixth method 1300 includes, at step 1303, automatically managing a calendar associated with the known individual. In an example, step 1303 can include automatically booking appointments for the individual, in response to a verbal request from the individual such as "Check and book appointment", or "Check calendar for a particular day or time or next possible appointment". In an example, if the individual's name is identified as 'John' based on his facial recognition, and he provides an audio input "Book appointment with Scott at 3 pm tomorrow", then the first processor circuit 102 can access John's calendar for events and appointment in the database 109, and report the next appointment time based on John's office calendar. The first processor circuit 102 can further look up Scott's calendar, for example if Scott is included in John's contact list. If Scott's availability permits, then the first processor circuit 102 can schedule the appointment between John and Scott at 3 pm.

FIG. 14 illustrates generally an example of a seventh method 1400 that can include automatically initiating communication between a recognized individual and another individual. In an example, the seventh method 1400 includes, at step 1401, using the first processor circuit 102 to process one or more images received from the image sensor 107 to determine whether a face of a known individual can be recognized in the environment. If the information from the image sensor 107 includes a known or recognized individual, then the seventh method 1400 can continue to step 1402.

In an example, the seventh method 1400 includes, at step 1402, detecting an audio input from the recognized individual, such as an input received using the audio sensor 105 and processed by the first processor circuit 102. In an example, the system 100 can be configured to determine whether a correspondence between the audio input and the recognized individual exists. That is, the system 100 can be configured to authenticate that the audio input is from the same recognized individual, such as using one or more auditory characteristics or signatures that can be unique to the individual. Such auditory characteristics or signatures can include programmed or learned attributes, such as can be provided at the same time as a particular individual is enrolled as a known individual.

In an example, the seventh method 1400 includes, at step 1403, initiating communication with someone from the known individual's personal contacts or address book. In an example, the communication to be initiated can be in response to a user input or command to initiate the communication. Step 1403 can include placing a call to someone who is in a contact list or address book associated with the known individual. For example, if a command from the known individual includes "Call X" where X corresponds to an entry in the known individual's contact list, then the system 100 can automatically initiate a telephone call between the known individual and X. In an example, if the known individual is identified as 'John' based on his facial recognition (e.g., at step 1401) and John instructs "Call Albert", then the first processor circuit 102 can retrieve John's contact list such as from the database 109 and retrieve information about how to reach Albert. Thereafter, the first processor circuit 102 can automatically call Albert, such as from a telecommunication device associated with John, such as John's cell phone, office phone, or other device.

FIG. 15 illustrates generally an example of an eighth method 1500 that can include changing a mode of a user controlled assistant device. In an example, the system 100 can be used to perform the eighth method 1500, and/or the apparatus 302 such as together with the UCVA 301 can be used to perform the eighth method 1500.

In an example, step 1501 can include receiving image data and/or video data from the image sensor 107 that is configured to monitor an environment. The environment can include, for example, a home environment, an office environment, or a public space or other environment. The eighth method 1500 can include, at step 1502, processing the image or video information that was received at step 1501. In an example, step 1502 can include using the first processor circuit 102 to determine information about one or more individuals in the environment. The information can include person information, such as including information about facial features, angles, moods, look directions, or other characteristics or attributes about one or more individuals in the environment. At step 1503, the method can include determining whether a first individual identified in the environment corresponds to a known or enrolled individual. Additionally, one or more characteristics or permissions associated with the first individual can be determined at step 1504. In an example, step 1504 can include receiving or retrieving the characteristics or permissions information, such as from the remote server 108. In an example, if the first individual is a known individual, then the system 100 can listen or monitor the environment for a command from the known individual.

At step 1505, the eighth method 1500 can include receiving a command from the first individual. In an example, the command includes instructions to put the system 100, or a device appurtenant to the system 100, in a monitoring or security mode. If the individual issuing the command has sufficient permissions to change the mode, then the system 100 can enter the monitoring or security mode. In an example, steps 1504 and/or 1505 can include comparing information about an observed individual with information about enrolled individuals and authorizations associated with the enrolled individuals. The steps can further include locally decoding a request or command using the audio processor circuit 104 and/or the video processor circuit 106. In an example, the eighth method 1500 can include communicating and/or decoding the request using the remote server 108. Responsive actions or instructions can be provided to the first processor circuit 102 and/or to other servers or devices to service the request or command.

In an example, the eighth method 1500 includes, at step 1507, pushing one or more alerts to an end user about activity detected by the system 100 when the system 100 is in a monitoring mode. The one or more alerts can include, for example, information about individuals detected in the environment, including authorized individuals and/or unauthorized individuals. In an example, the one or more alerts can include video and/or audio information. In an example, the one or more alerts can be provided to a user and/or to a central monitoring systems if so configured. In an example, a central monitoring system can have an API (application program interface) that can be used to generate an alert so that a human or processor-implemented monitor system can remotely view live audio and/or video information about the monitored environment and can notify authorities if deemed necessary. The system 100 can store these alerts and can capture the associated video and/or audio information so that such information can be retrieved later by the user or pushed to the cloud for long term storage. The various systems and devices discussed herein can be further configured to carry out or perform various other methods or tasks. For example, a method can include receiving, such as by one or more processor circuits or using the system 100, input data from an input device, and the input device can include at least one image sensor to capture a video stream comprising a sequence of images and at least one audio sensor to capture audio signals associated with the video stream. The method can include extracting, by the one or more processor circuits, feature data from the input data to detect one or more objects in respective images of the video stream, and the feature data can be extracted substantially in real-time with capture of the input data. In an example, the extraction of feature data includes determining a shape and/or size characteristic of the one or more objects.

In an example, a method can include determining, by the one or more processor circuits, an event based on a comparison of attributes of the detected one or more objects with pre-defined rules. In response to the determination, a notification about the event can be communicated to a user or other system owner or system controller. In an example, the detection of objects in the respective images can be performed using a processor circuit to apply a deep learning model, such as a neural network-based object classification model. In an example, the at least one audio sensor captures audio commands from the user to set the one or more processor circuits in an assistant mode or a monitoring mode based on authentication of the user. In an example, the one or more processor circuits are automatically configured to operate in a monitoring mode based on detection of a particular or specified one or more objects.

In an example, each of the detected one or more objects is tracked over a sequence of images or frames to determine motion of each of the detected one or more objects. In an example, the method includes associating the detected one or more objects with at least one category, the at least one category comprising human, pet, plant, and smart device categories. In an example, in response to determining that an object belongs to a human category, the method includes performing face recognition to identify the human as a known individual or an unknown individual. In an example, a notification can be sent to one or more users based on a set of notification preferences or rules that are defined for each respective user.

In an example, a system for implementing one or more methods discussed herein can include an input device with at least one image sensor and at least one audio sensor. The image sensor can be configured to capture a video stream comprising a sequence of images or frames and the audio sensor can be configured to capture audio signals or samples associated with the video stream. The system can include a processor circuit coupled with a memory, and the memory can store instructions executable by the processor to receive input data from the input device, and extract feature data from the input data to detect one or more objects in respective images of the video stream. In an example, the feature data can be extracted substantially in real-time with capture of the input data. The instructions can further configure the processor circuit to determine an event based on a comparison of attributes of the detected one or more objects with a set of pre-defined rules. In response to the determination, a notification about the event can be communicated to a user or other system controller.

In an example, an audio-video personal assistant device includes a processor circuit, a non-transitory memory circuit or storage element coupled to the processor, and encoded instructions stored in the non-transitory memory circuit or storage element. The encoded instructions, when implemented by the processor circuit, configure the processor circuit to process one or more images captured by an image sensor, to recognize one or more user faces and user context in the one or more images, and determine one or more identities corresponding to the one or more user faces using a reference database of face information. In an example, the instructions can configure the processor circuit to determine one or more of a facial angle or look direction, facial feature, and mood or expression. The recognized image data can be combined with one or more audio inputs, such as from the same recognized user, to authenticate the user using the audio and image data together. One or more tasks specific to the authenticated user can then be automatically initiated or performed.

Various aspects of the present discussion can be implemented in the form of a computer programmable product for performing audio and/or video data receipt and analysis. The computer programmable product can include a set of instructions that, when executed by a processor, causes the processor to perform the various methods and techniques as discussed herein.

Figure 16:
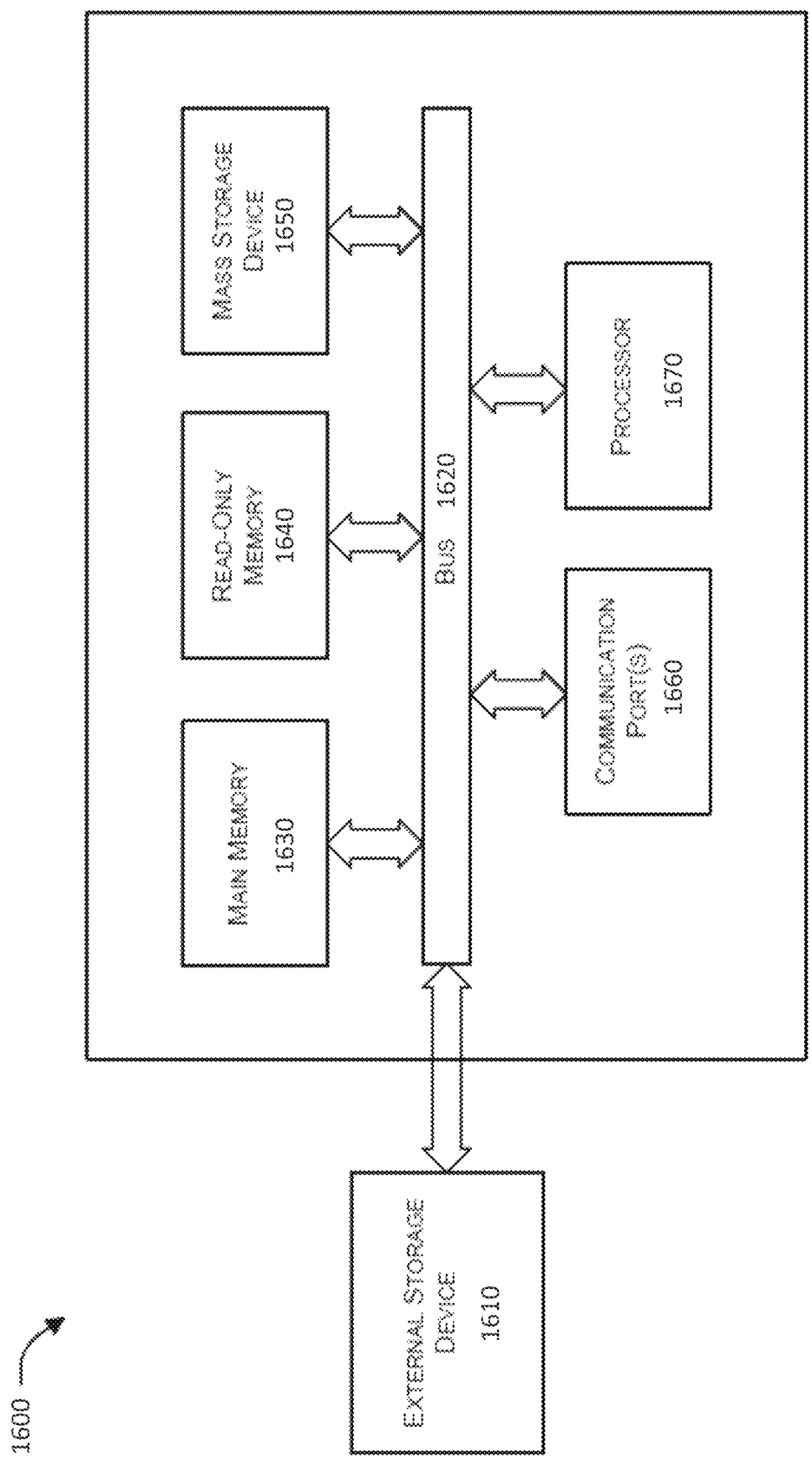
FIG. 16 illustrates generally an example of a computer system.

FIG. 16 illustrates generally an example of a computer system 1600 in which or with which various examples discussed herein can be performed. The computer system 1600 can include an external storage device 1610, a bus 1620, a main memory 1630, a read-only memory 1640, a mass storage device 1650, communication port(s) 1660, and a processor 1670. In an example, the processor 1670 includes or corresponds to the first processor circuit 102 or another processor circuit or processor discussed herein. In an example, the computer system 1600 can include more than one processor and communication ports. Examples of the processor 1670 can include, but are not limited to, various modules/engines associated with embodiments of the present invention. The communication port 1660 can be any interface such as an RS-232 port, a 10/100 Ethernet port, a Gigabit or 10 Gigabit port using copper or fiber, a serial port, a parallel port, an optical port, or other existing or future port topology. The communication port 1660 can be chosen depending on a network, such a Local Area Network (LAN), Wide Area Network (WAN), or any network to which computer system connects.

In an example, the memory 1630 can be Random Access Memory (RAM), or any other dynamic storage device commonly known in the art. The read only memory 1640 can be any static storage device(s) e.g., but not limited to, a Programmable Read Only Memory (PROM) chips for storing static information e.g., start-up or BIOS instructions for the processor 1670. The mass storage 1650 can be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

The bus 1620 communicatively couples the processor(s) 1670 with the other memory, storage and communication blocks. The bus 1620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), such as can be used to connect the processor 1670 to various software systems.

Operator and administrative interfaces such as a display, keyboard, and a cursor control device, can be coupled to the bus 1620 such as to support operator interaction with the system. Other operator and administrative interfaces can be provided through network connections such as using the communication port 1660. External storage device 1610 can be any one or more of an external hard-drive, floppy drive, Zip Drive, Compact Disc—Read Only Memory (CD-ROM), Compact Disc—Re-Writable (CD-RW), Digital Video Disk—Read Only Memory (DVD-ROM), or other storage device. Components described here are intended to be understood as examples of various possible components to be used and should not be considered to limit the scope of the present disclosure.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An environment analysis device comprising:
    a processor circuit configured to receive image information from an image sensor and to receive audio information from an audio sensor; and
    a non-transitory memory circuit coupled to the processor circuit, the non-transitory memory circuit comprising instructions that, when performed by the processor circuit, configure the processor circuit to:
    analyze at least one of the image information or the audio information to determine multiple individuals that are within a field of view of the image sensor, and utilize artificial intelligence to identify the multiple individuals present within the field of view at an event in an environment;
    compare an expected attendance at the event in the environment with the identified multiple individuals present at the event in the environment to identify an absent individual; and
    provide a notification to the absent individual about the event in the environment.

2. The environment analysis device of claim 1, wherein the instruction configure the processor circuit to analyze the image information and the audio information together, using applied machine learning, to identify each of the individuals present at the event in the environment.

3. The environment analysis device of claim 1, wherein the instructions further configure the processor circuit to:
    analyze the at least one of the image information or the audio information to identify whether a specified individual is present in the environment; and
    use the at least one of the image information and the audio information to confirm that the specified individual is present in the environment.

4. The environment analysis device of claim 3, wherein the instructions further configure the processor circuit to perform a personalized task associated with the specified individual when the specified individual is confirmed to be present in the environment.

5. The environment analysis device of claim 3, wherein the instructions further configure the processor circuit to determine a dwell time for the specified individual in the environment and determine the individual is unauthorized after a specified dwell duration elapses.

6. The environment analysis device of claim 3, wherein the instructions to configure the processor circuit to compare the expected attendance at the event with the identified multiple individuals present at the event includes performing the comparison in response to confirming that the specified individual is present in the environment.

7. The environment analysis device of claim 6, wherein the instructions further configure the processor circuit to, in response to confirming that the specified individual is present in the environment, cause the device to exit a security monitoring mode and enter an assistant mode, wherein in the security monitoring mode the device is configured to identify an adverse event in the environment, and in the assistant mode the device is configured to perform one or more tasks for the specified individual.

8. The environment analysis device of claim 1, wherein the instructions configure the processor circuit to analyze the image information and the audio information together to identify the multiple individuals present at the event in the environment.

9. The environment analysis device of claim 1, wherein the instructions further configure the processor circuit to:
    use the at least one of the image information or the audio information to identify a particular individual, from among the multiple individuals, who is speaking at the event; and
    record the image information and/or the audio information when the particular individual is speaking.

10. The environment analysis device of claim 1, wherein the instructions further configure the processor circuit to identify a look direction of one or more of the identified individuals at the event in the environment.

11. The environment analysis device of claim 1, wherein the instructions further configure the processor circuit to identify a mood of one or more of the identified individuals at the event in the environment.

12. A method comprising:
    receiving, at a processor circuit of a virtual assistant device provided in an environment, respective signals with information about the environment, the signals provided by respective different environment sensors including an audio sensor and an image sensor; and
    using the processor circuit of the virtual assistant device:
    determining multiple individuals that are within a field of view of the image sensor;
    applying artificial intelligence-based processing to analyze together the information about the environment as-received from the different environment sensors and, based on the analysis, identifying the multiple individuals present within the field of view at an event in the environment;

comparing an expected attendance at the event in the environment with the identified multiple individuals present at the event in the environment to identify an absent individual; and providing a notification to the absent individual about the event in the environment.

13. The method of claim 12, further comprising, using the processor circuit, identifying each of the multiple individuals present at the event using audio information from the audio sensor and using image information from the image sensor.

14. The method of claim 12, further comprising, using the processor circuit:

analyzing at least one of audio information from the audio sensor and image information from the image sensor to identify whether a specified individual is present at the event in the environment; and analyzing the at least one of the audio information from the audio sensor and the image information from the image sensor to confirm that the specified individual is present at the event in the environment.

15. The method of claim 14, further comprising, using the processor circuit, performing a personalized task associated with the specified individual when the specified individual is confirmed to be present in the environment.

16. The method of claim 15, wherein the personalized task includes the comparing the expected attendance at the event with the identified multiple individuals present at the event to identify the absent individual.

17. The method of claim 15, further comprising, in response to confirming the specified individual is present, changing an operating mode of the virtual assistant device, including changing from a security monitoring mode to an assistant mode, wherein in the security monitoring mode the device is configured to identify an adverse event in the environment, and in the assistant mode the device is configured to perform one or more tasks for the specified individual.

18. The method of claim 14, further comprising, using the processor circuit, determining a dwell time for the specified individual in the environment and determining the individual is unauthorized after a specified dwell time elapses.

19. The method of claim 12, further comprising, using the processor circuit, identifying a particular individual, from among the identified individuals, who is speaking at the event and, in response, recording audio information from the audio sensor or image information from the image sensor when the particular individual is speaking.

20. The method of claim 19, further comprising identifying the particular individual based on a determined mood or a determined look direction of one or more of the identified individuals at the event.

* * * * *